US012367416B2

(12) United States Patent
Zhu et al.

(10) Patent No.: US 12,367,416 B2
(45) Date of Patent: Jul. 22, 2025

(54) UNIVERSAL FAULT-TOLERANT QUANTUM COMPUTATION WITH A 2D ABELIAN TOPOLOGICAL STABILIZER CODE USING MAGIC PATCHES

(71) Applicants: International Business Machines Corporation, Armonk, NY (US); University of Maryland, College Park, MD (US)

(72) Inventors: Guanyu Zhu, Ossining, NY (US); Tomas Raphael Jochym-O'Connor, Los Angeles, CA (US); Arpit Dua, Altadena, CA (US); Maissam Barkeshli, Bethesda, MD (US)

(73) Assignees: INTERNATIONAL BUSINESS MACHINES CORPORATION, Armonk, NY (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 158 days.

(21) Appl. No.: 18/344,587

(22) Filed: Jun. 29, 2023

(65) Prior Publication Data
US 2025/0005421 A1    Jan. 2, 2025

(51) Int. Cl.
*H03M 13/00*    (2006.01)
*G06N 10/70*    (2022.01)

(52) U.S. Cl.
CPC .................... *G06N 10/70* (2022.01)

(58) Field of Classification Search
CPC ............................ G06N 10/70; G06N 10/00
See application file for complete search history.

(56) References Cited

U.S. PATENT DOCUMENTS

| | | | | |
|---|---|---|---|---|
| 7,277,872 | B2 * | 10/2007 | Raussendorf | G06N 10/40 706/14 |
| 10,248,491 | B1 * | 4/2019 | Zeng | G06F 11/1044 |
| 10,483,980 | B2 * | 11/2019 | Sete | G06N 10/40 |

(Continued)

FOREIGN PATENT DOCUMENTS

WO    2022251913 A1    12/2022

OTHER PUBLICATIONS

Kubica, et al. "Unfolding the color code", arXiv:1503.02065v1 [quant-ph] Mar. 6, 2015, 46 pages.

(Continued)

*Primary Examiner* — Esaw T Abraham
(74) *Attorney, Agent, or Firm* — Amin, Turocy & Watson, LLP

(57) ABSTRACT

Various systems and methods are presented regarding applying a non-Clifford logical CCZ gate in a 2D topological code, e.g., a 2D Abelian code. A Kirigami cut and fold process is applied to an initial 3D quantum error-correcting code composed of three copies of 3D surface codes to reduce (cut) a qubit lattice to a hollow cube such that the cube is formed of surfaces comprising qubits. The CCZ is applied to the hollow cube, with the cube subsequently flattened (folded) from the 3D arrangement to a 2D code arrangement. A lattice surgery process can be performed to map/transfer the 2D code arrangement to an ancilla Kirigami code(s), whereupon the 2D code arrangement can be returned to a 2D surface code for further application of a logical Clifford gate, if so desired.

20 Claims, 21 Drawing Sheets

(56) References Cited

U.S. PATENT DOCUMENTS

| | | | |
|---|---|---|---|
| 11,410,070 B2* | 8/2022 | Das | G06N 10/80 |
| 11,562,284 B1* | 1/2023 | Ryan | H03K 19/195 |
| 2021/0374588 A1* | 12/2021 | Gidney | G06N 10/60 |

OTHER PUBLICATIONS

Vasmer, et al. "Three-dimensional surface codes: Transversal gates and fault-tolerant architectures" arXiv:1801.04255v2 [quant-ph] Dec. 5, 2019, 23 pages.

Zhu et al. "Topological Order, Quantum Codes, and Quantum Computation on Fractal Geometries" PRX Quantum 3, 030338 (2022), 55 pages.

Hector Bombin "2D quantum computation with 3D topological codes" arXiv:1810.09571v1 [quant-ph] Oct. 22, 2018, 27 pages.

Benjamin J. Brown "A fault-tolerant non-Clifford gate for the surface code in two dimensions" arXiv:1903.11634v1 [quant-ph] Mar. 27, 2019, 15 pages.

Ellison, et al. "Pauli Stabilizer Models of Twisted Quantum Doubles" American Physical Society, PRX Quantum 3, 010353 (2022), 37 pages.

Zhu, et al. "Quantum origami: Transversal gates for quantum computation and measurement of topological order" Physical Review Research 2, 013285 (2020), 24 pages.

* cited by examiner

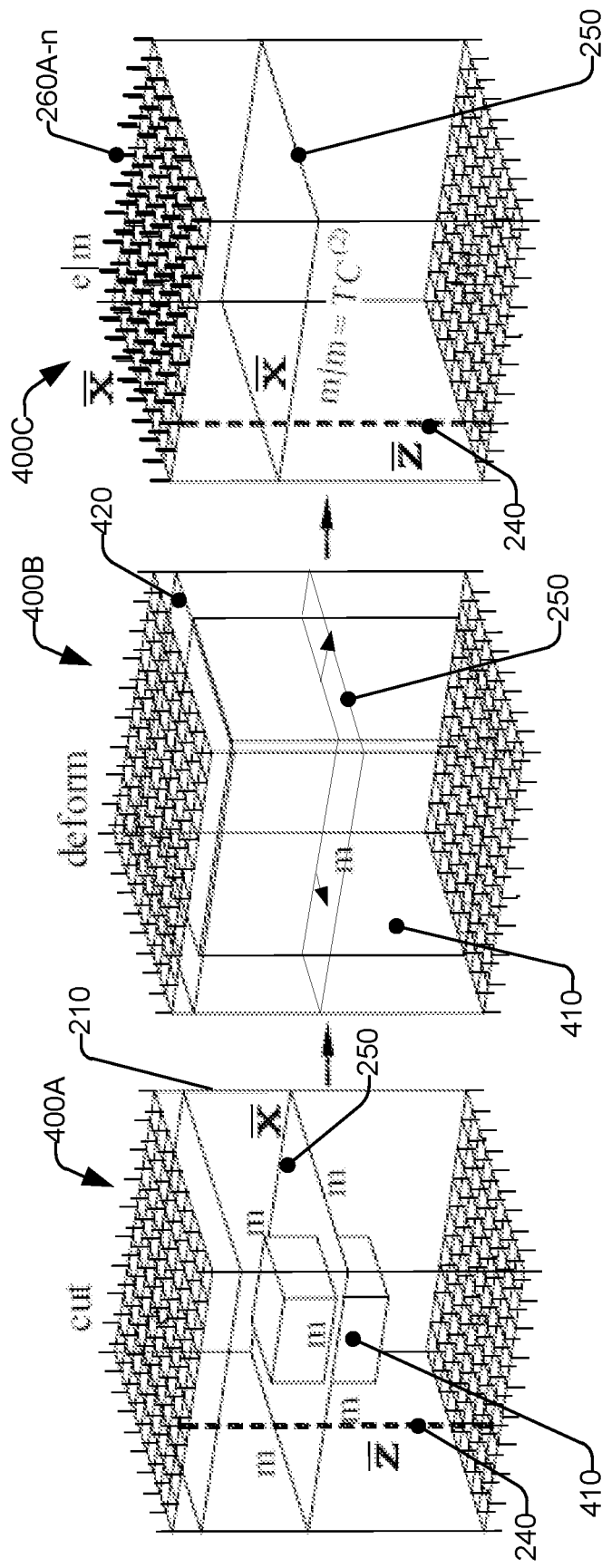

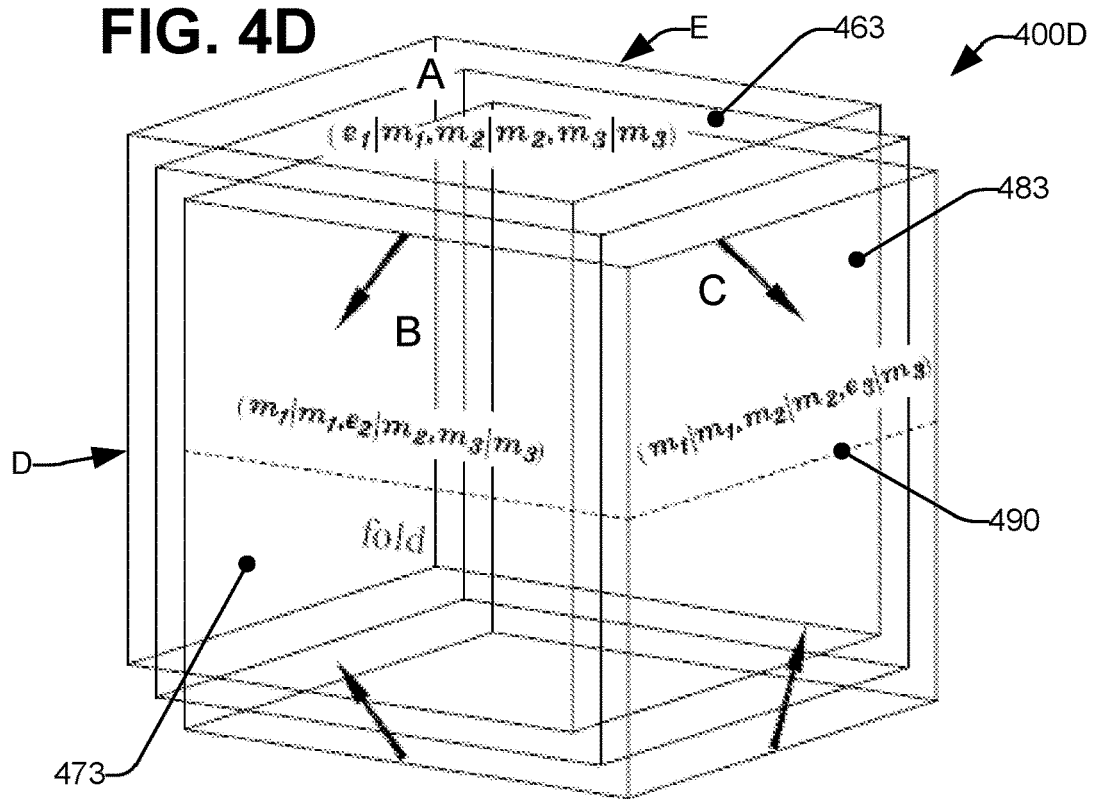
FIG. 4D
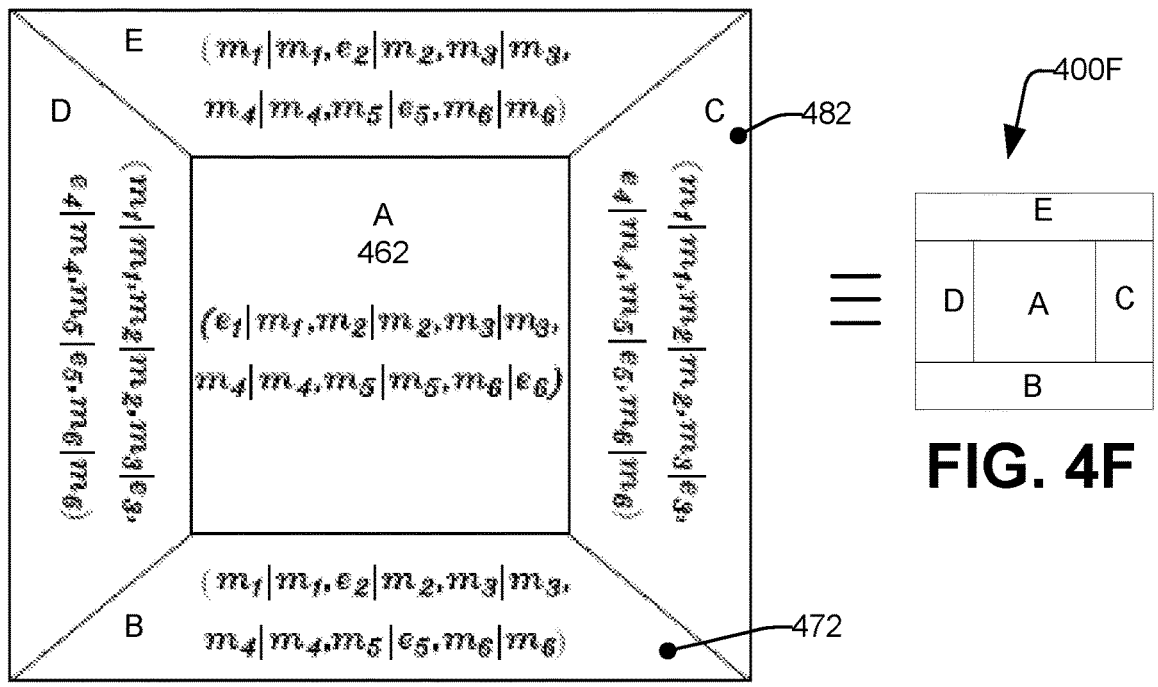
FIG. 4E
FIG. 4F

DEFORM AND FOLD FROM 3D INTO 2D

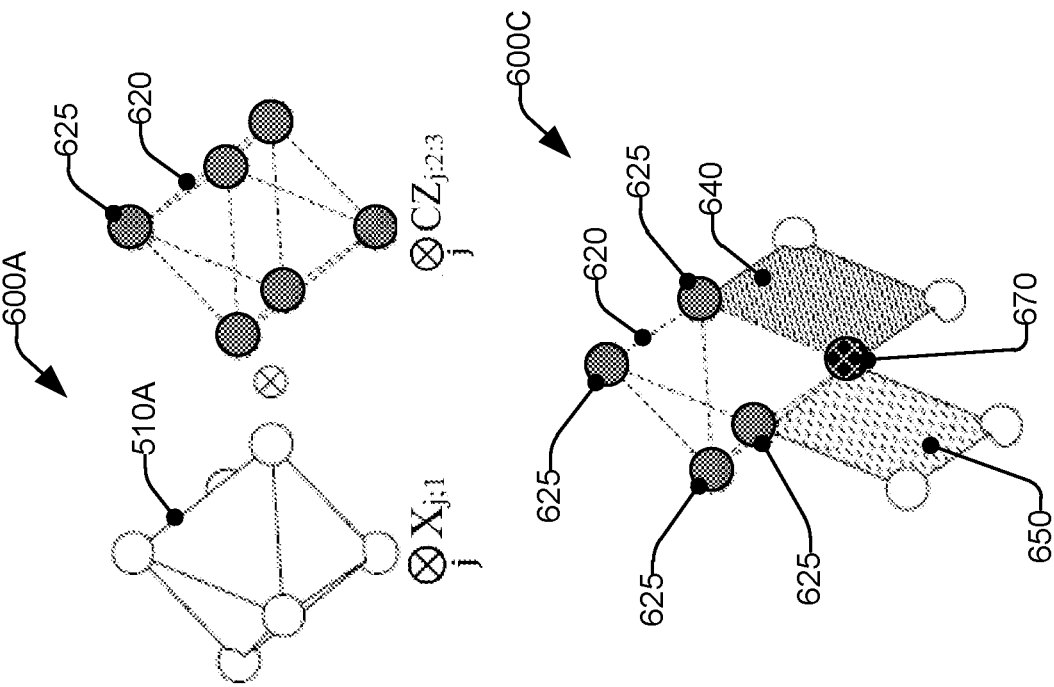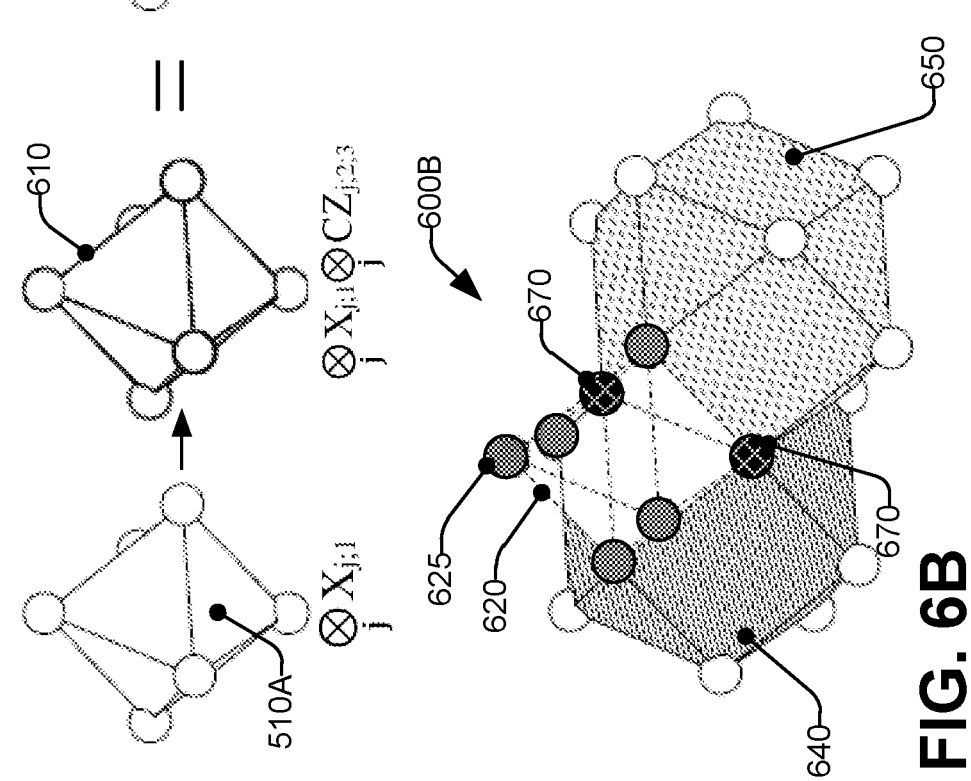

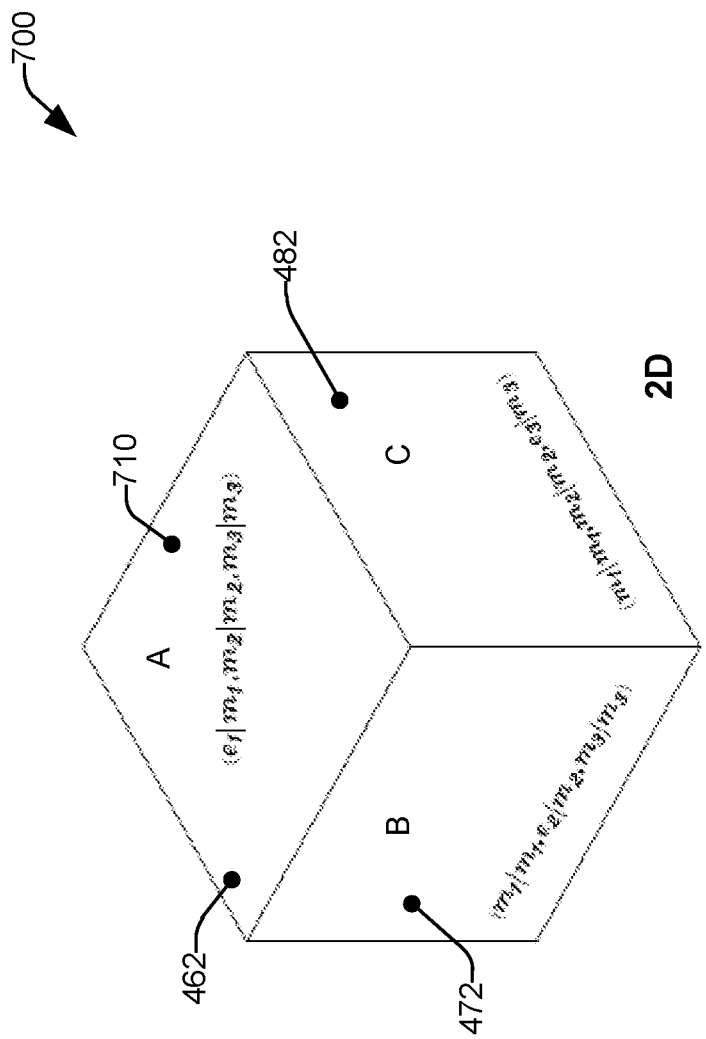

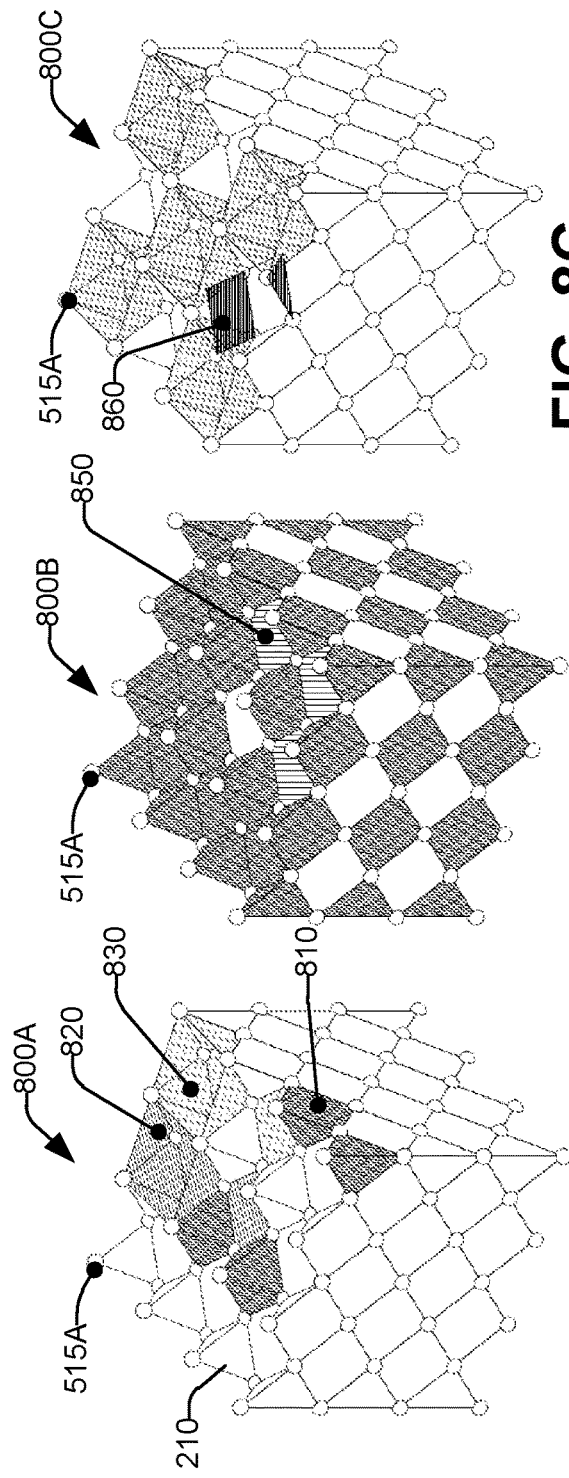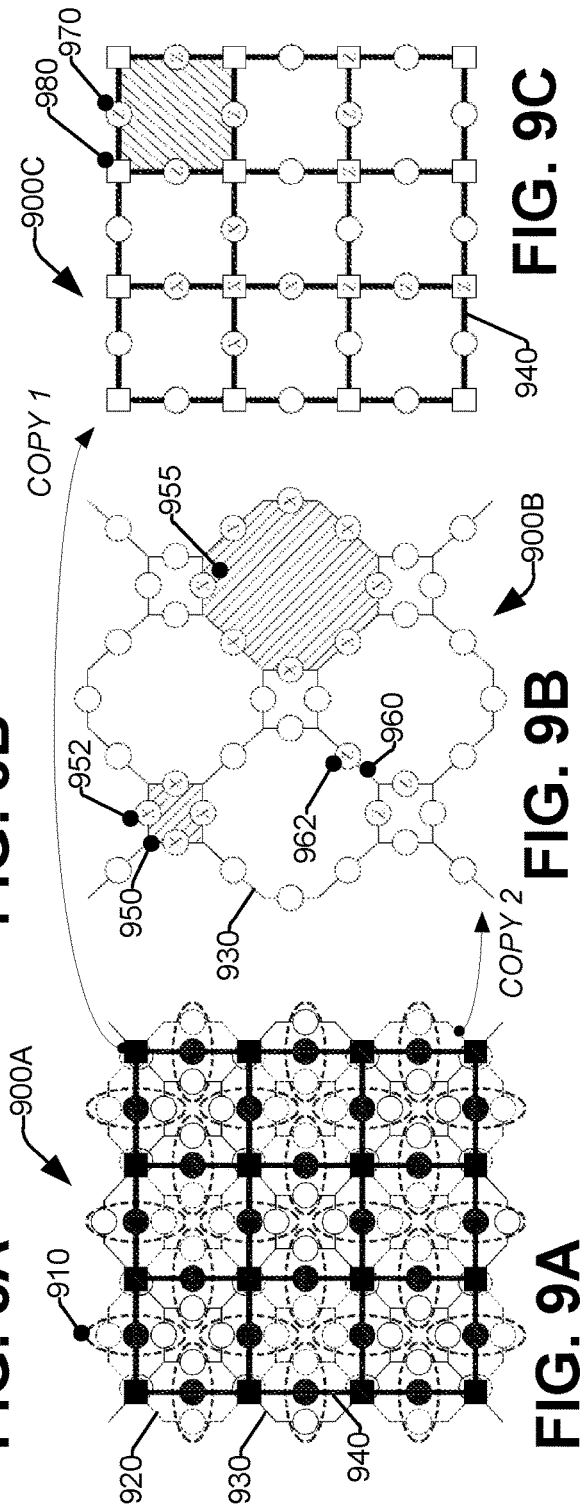

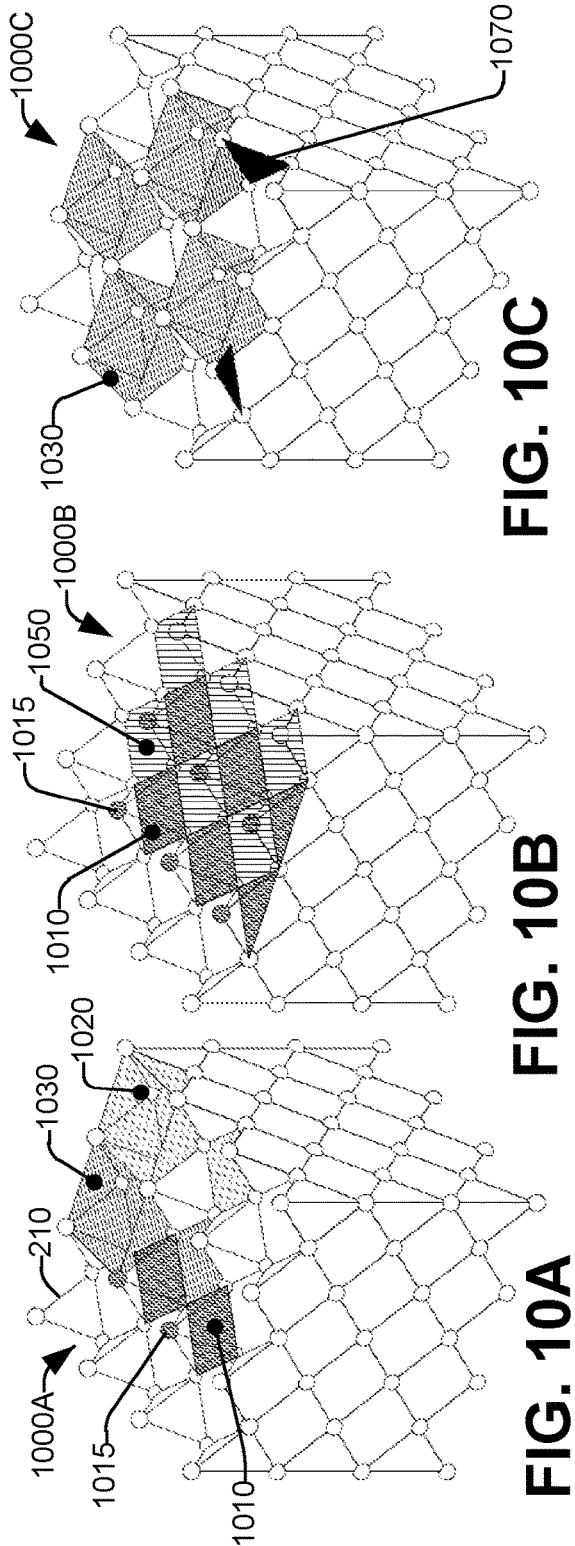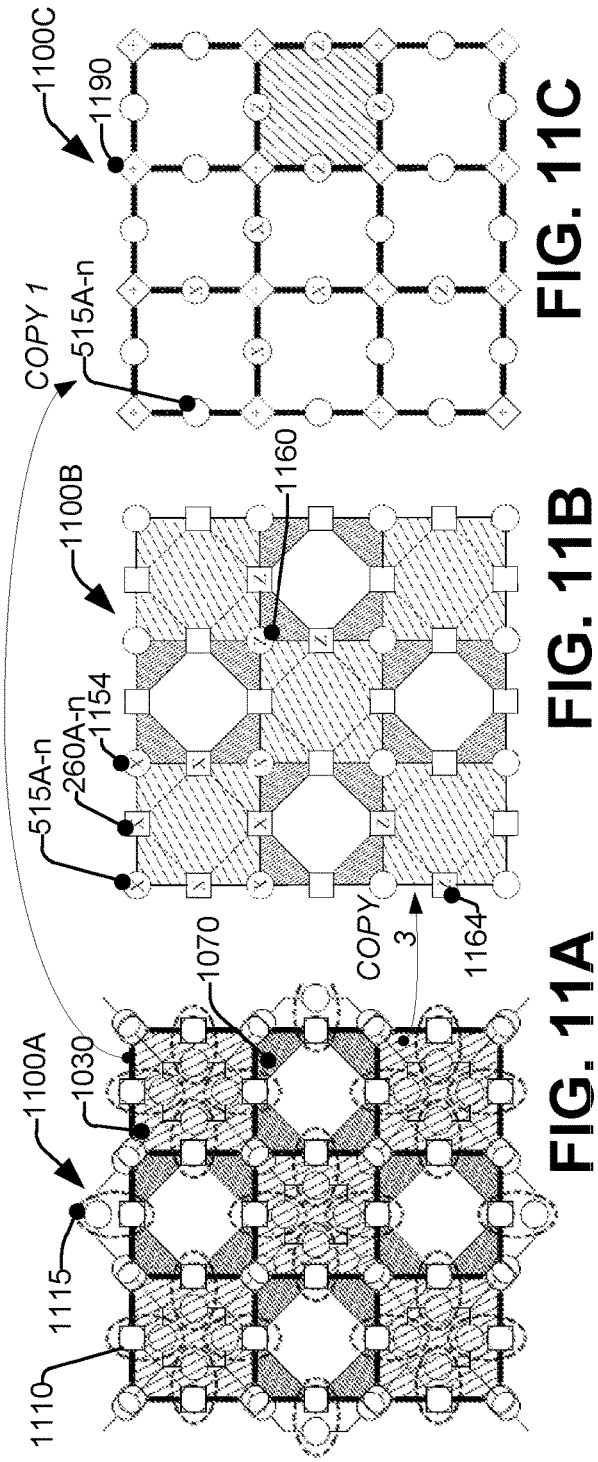

(further depicted in FIG.13A)

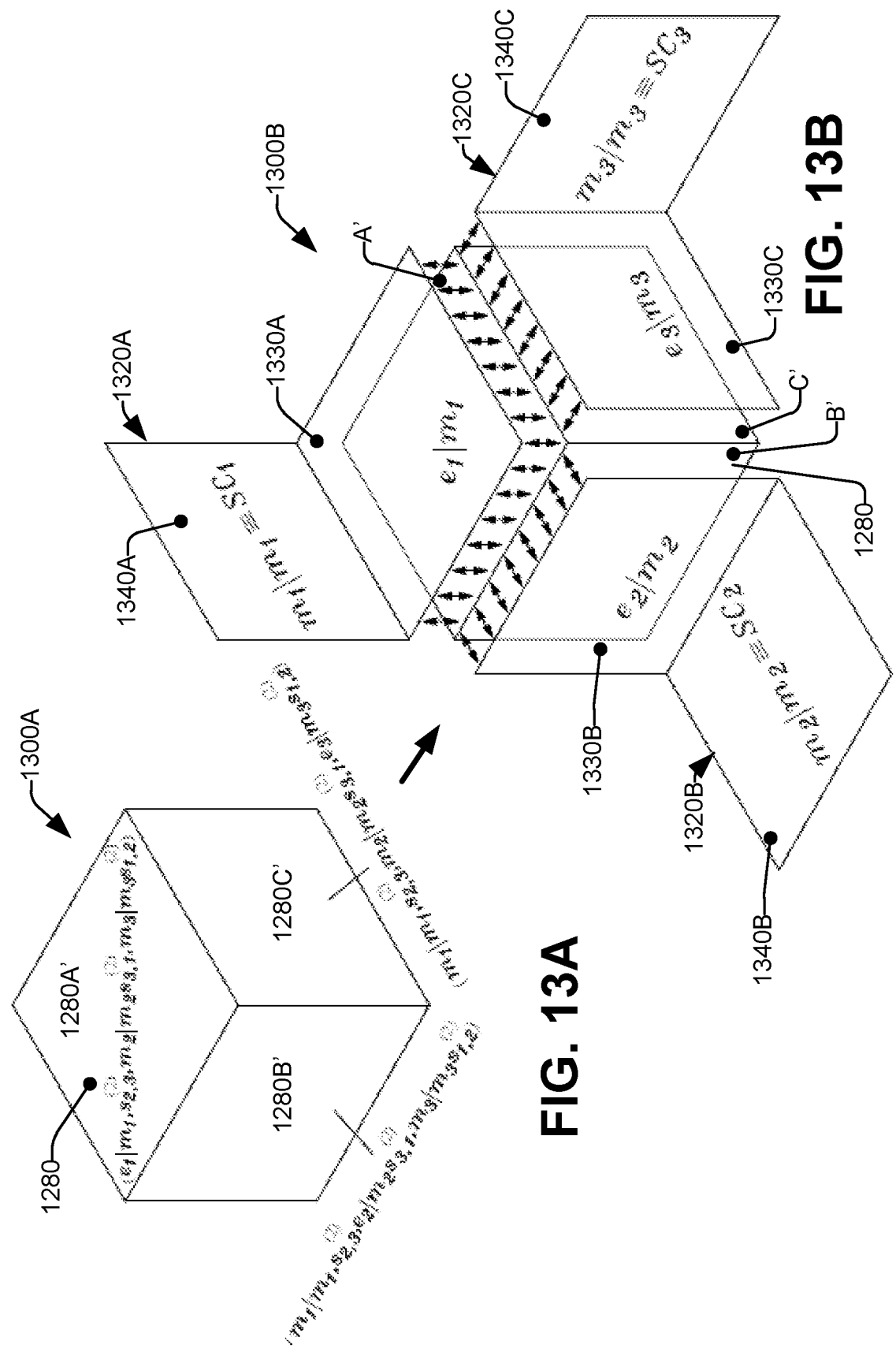

UNIVERSAL FAULT-TOLERANT QUANTUM COMPUTATION WITH A 2D ABELIAN TOPOLOGICAL STABILIZER CODE USING MAGIC PATCHES

This invention was made with government support under DE-SC0012704 awarded by DOE Office of Science National Quantum Information Science Research Centers, Co-design Center for Quantum Advantage (C2QA). The government has certain rights to this invention.

BACKGROUND

The subject disclosure relates to quantum computing systems and more specifically to application of a quantum error-correcting code.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate incorporation of a non-Clifford gate into a two-dimensional quantum error-correcting code.

In an embodiment, a quantum computing system can comprise at least one processor; and a memory coupled to the at least one processor and having instructions stored thereon, wherein, in response to the at least one processor, the instructions facilitate performance of operations, comprising: generating a two-dimensional (2D) quantum error-correcting (QEC) code, wherein the 2D QEC includes a non-Clifford logical gate configuration; and applying the 2D QEC on a qubit lattice.

In another embodiment, the operations can further comprise: receiving a 2D QEC; and a 3D surface code, wherein the 2D QEC and 3D surface code represent respective qubits in the qubit lattice. In an embodiment, the 2D QEC and 3D surface code are Abelian topological codes. In an embodiment, the non-Clifford logical gate is a control-control-Z (CCZ) logical gate. In another embodiment, the non-Clifford logical gate is a T-type logical gate.

In another embodiment, the operations can further comprise: applying a Kirigami cut process to the 3D surface code to remove an inner portion of the 3D lattice, thereby reducing the 3D surface code to a Kirigami 3D code comprising a thin-walled topological arrangement. In a further embodiment, the operations can further comprise: applying a non-Clifford logical gate to the Kirigami 3D code to modify the Kirigami 3D code, wherein the modified Kirigami 3D code includes a non-Clifford logical gate configuration. In a further embodiment, the operations can further comprise: applying a Kirigami fold process to the modified Kirigami 3D code to reduce the Kirigami 3D code to the 2D QEC, wherein the 2D QEC includes the non-Clifford logical gate configuration. In an embodiment, the operations can further comprise implementing a lattice surgery protocol to the Kirigami 3D code to map the Kirigami 3D code comprising the non-Clifford logical gate configuration. The lattice surgery protocol can further comprise introducing an ancilla Kirigami code block to the Kirigami 3D code comprising the non-Clifford logical gate configuration; and mapping the Kirigami 3D code comprising the non-Clifford logical gate configuration to the ancilla Kirigami code block. In another embodiment, the operations can further comprise applying the 2D QEC having the non-Clifford logical gate configuration to the qubit lattice.

In other embodiments, elements described in connection with the disclosed systems can be embodied in different forms such as computer-implemented methods, computer program products, or other forms. In an embodiment, a computer-implemented method can comprise generating, by a device comprising a processor, a two-dimensional (2D) quantum error-correcting code (QEC), wherein the 2D QEC includes a non-Clifford logical gate configuration for application on a qubit lattice, wherein the device is located on a quantum computer system; and applying, to a quantum processor by a control system instructed by the processor, the 2D QEC. In an embodiment the non-Clifford logical gate is a control-control-Z (CCZ) logical gate. In an embodiment, the computer-implemented method of claim 11, can further comprise receiving, by the device, a 2D QEC and a 3D surface code, wherein the 2D QEC and 3D surface code represent respective qubits the qubit lattice.

In a further embodiment, the computer-implemented method can further comprise: applying, by the device, a Kirigami cut process to the 3D surface code to remove an inner portion of the 3D lattice, thereby reducing the 3D surface code to a Kirigami 3D code comprising a thin-walled topological arrangement; further applying, by the device, a non-Clifford logical gate to the Kirigami 3D code to modify the Kirigami 3D code, wherein the modified Kirigami 3D code includes a non-Clifford logical gate configuration; and further applying, by the device, a Kirigami fold process to the modified Kirigami 3D code to reduce the Kirigami 3D code to a 2D QEC, wherein the 2D QEC includes the non-Clifford logical gate configuration.

In a further embodiment, the computer-implemented method can further comprise implementing, by the device, a lattice surgery protocol to the Kirigami code to map the Kirigami 3D code comprising the non-Clifford logical gate configuration, the lattice surgery protocol can further comprises applying, by the device, an ancilla Kirigami code block to the modified Kirigami 3D code comprising the non-Clifford logical gate configuration; and further mapping, by the device, the modified Kirigami 3D code comprising the non-Clifford logical gate configuration to the ancilla Kirigami code block.

The embodiments can further comprise a computer program product stored on a non-transitory computer-readable medium and comprising machine-executable instructions, wherein, in response to being executed, the machine-executable instructions cause a machine to perform operations, comprising: generating, by a device comprising a processor, a two-dimensional (2D) quantum error-correcting code (QEC), wherein the 2D QEC includes a non-Clifford logical gate configuration for application on a qubit lattice, wherein the device is located on a quantum computer system; and applying, to a quantum processor by a control system instructed by the processor, the 2D QEC. In an embodiment, the non-Clifford logical gate is a control-control-Z (CCZ) logical gate.

In an embodiment, the operations can further comprise: receiving, by the device, a 2D QEC, and a 3D surface code wherein the 2D QEC and 3D surface code represent respective qubits in the qubit lattice. In a further embodiment, the operations can further comprise applying a Kirigami cut process to the 3D surface code to remove an inner portion of a 3D lattice included in the 3D surface code, thereby reducing the 3D surface code to a Kirigami 3D code comprising a thin-walled topological arrangement; further applying a non-Clifford logical gate to the Kirigami 3D code to modify the Kirigami 3D code, wherein the modified Kirigami 3D code includes a non-Clifford logical gate configuration; and further applying a Kirigami fold process to the modified Kirigami 3D code to reduce the modified Kirigami 3D code to a 2D QEC, wherein the 2D QEC includes the non-Clifford logical gate configuration.

In another embodiment, the operations can further comprise implementing a lattice surgery protocol to the modified Kirigami 3D code to map the modified Kirigami 3D code comprising the non-Clifford logical gate configuration. In an embodiment, the lattice surgery protocol further comprises: applying an ancilla Kirigami code block to the modified Kirigami 3D code comprising the non-Clifford logical gate configuration, and further mapping the modified Kirigami 3D code comprising the non-Clifford logical gate configuration to the ancilla Kirigami code block.

DESCRIPTION OF THE DRAWINGS

One or more embodiments are described below in the Detailed Description section with reference to the following drawings:

FIGS. 4A-H present schematics illustrating respective stages and concepts regarding application of a Kirigami technique as part of compactification of a 3D surface code to a 2D surface code, in accordance with various embodiments.

FIGS. 6A-C present schematics illustrating an example of the action of application of a transversal CCZ gate on the X stabilizers of a surface code, in accordance with an embodiment.

FIG. 7 presents a schematic of a compactified 2D Kirigami code having three different lattice types on the three different surfaces, in accordance with an embodiment.

FIGS. 8A-C present schematics illustrating the cutting the bulk out of a 3D lattice model and the construction of lattice corresponding to a first type surface, in accordance with a least one embodiment.

FIGS. 9A-C present schematics illustrating a 2D layout representation of a compactified (from 3D to 2D) Kirigami code.

FIGS. 10A-C present schematics illustrating the cutting of the bulk on the 3D lattice model and the construction of lattice corresponding to a second type surface, in accordance with a least one embodiment.

FIGS. 11A-C present schematics illustrating the corresponding 2D layout of a Kirigami code, in accordance with an embodiment.

FIGS. 13A-B present schematics illustrating a lattice surgery protocol to enable $\mathcal{H}$ the surface code to be mapped to the original code space, in accordance with an embodiment.

DETAILED DESCRIPTION

Figure 1:
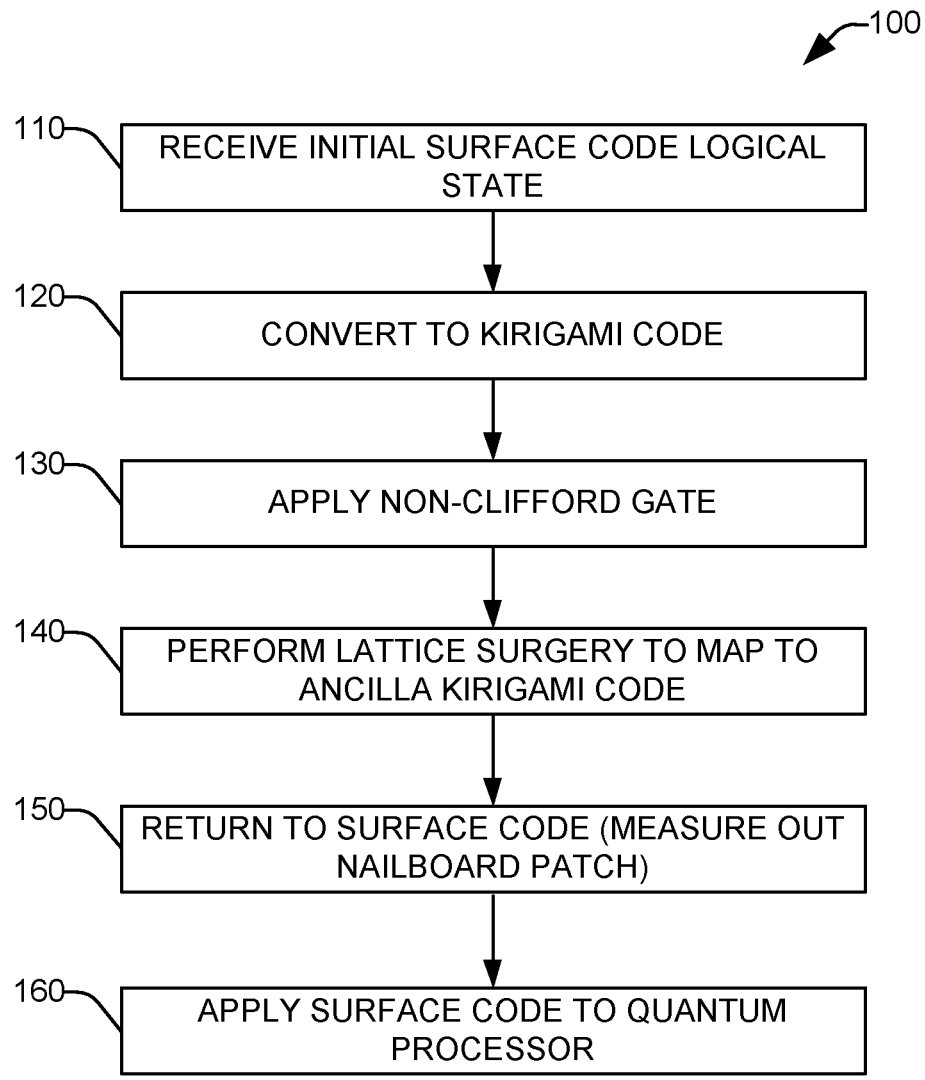
FIG. 1 presents a computer-implemented methodology to apply a non-Clifford gate to a quantum surface code, according to one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

While quantum computing offers untold potential and application, achieving and sustaining "coherence" of a qubit is critical for operation of a quantum computer. A fundamental aspect of maintaining qubit coherence is isolation of the qubit from unwanted interacting with its operational environment. Interactions of qubits with the environment can rapidly render a qubit "incoherent", which can rapidly throw into doubt an operational outcome/state of a quantum computer when processing an algorithm. Accordingly, quantum error correction (QEC) codes can be utilized to correct the error, e.g., by utilizing ancilla qubits to determine whether a qubit of concern is in an error state.

Two-dimensional (2D) systems (e.g., for implementation as part of a QEC code) have been developed, into which low level of complexity gates can be incorporated with relative ease. For example, Clifford gates can be incorporated into a 2D system. However, non-Clifford gates such a control-control-z (CCZ, aka a non-Clifford logical CCZ, a transversal CCZ gate, and suchlike) gate or a T-type gate have higher levels of complexity, and accordingly, typically require application to a three-dimensional (3D) code (e.g., a surface code). However, 3D codes are complicated to implement at a quantum computing system compared to a 2D code.

Per the various embodiments presented herein, a CCZ gate (e.g., represented herein as $\otimes_j CCZ_{j;1,2,3}$) can be applied to a 3D surface code, wherein the 3D lattice pertaining to the 3D surface code can undergo application of a Kirigami Code process enabling the 3D lattice to further undergo compactification from the 3D representation and return to a 2D representation. The respective techniques presented herein utilize topological technologies to enable a 3D representation to be deformed to a 2D representation, without any loss of information. Accordingly, the modified 2D surface code (e.g., transformed with the CCZ logical gate) can now be applied to the 2D quantum system, enabling operation of the 2D surface code comprising a CCZ gate. In an embodiment, the 2D surface code is an Abelian topological stabilizer code.

Throughout the following, the terms surface code and toric code are used interchangeably. Further, n denotes an integer greater than zero.

1. Overview

FIG. 1, schematic 100 illustrates a computer-implemented methodology to apply a non-Clifford gate to a quantum surface code, according to one or more embodiments. FIG. 1 provides a high level overview of the various embodiments, as further described herein.

At 110, an initial/original surface code (e.g., code 1675) (e.g., an error correction code (QEC)) can be received. In an embodiment, the initial/original surface code can be a 2D representation of a qubit array/lattice (e.g., qubit array 1640), wherein, per the following, a copy of the original 2D surface code can be converted to a 3D surface code (e.g., a Kirigami code 1680) and subsequently returned to a 2D surface code (e.g., second quantum error-correcting code 1687, or returned to an original code 1675) (e.g., after application of a logical gate). As previously mentioned, operation of 2D surface codes can function with one or more Clifford gates (e.g., Clifford gate 1677). However, an application (e.g., an algorithm) may require functionality of a non-Clifford gate (e.g., non-Clifford gate 1685), such as a transversal CCZ gate. In terms of complexity, it can be difficult/impossible to incorporate a CCZ gate (and other non-Clifford gates, such as a T-type gate) directly into a 2D surface code. However, a CCZ gate can be applied to a 3D surface code. Per the various embodiments, advantage can be taken of application of the CCZ gate to the 3D surface code, which can be subsequently reduced to a 2D surface code.

At 120, the 3D surface code can undergo a Kirigami code process (e.g., a cut and fold process) to form a Kirigami quantum error-correcting code (e.g., Kirigami code 1680). In an embodiment, the Kirigami code process can be performed using a constant-depth circuit. In another embodiment, the Kirigami code process can be considered to be an implementation of a 3D-topological stabilizer code process.

At 130, a non-Clifford gate, e.g., a CCZ gate, can be applied to the qubit array (e.g., by running the quantum computer system 1620), wherein the CCZ gate is applied to each individual qubit represented in the Kirigami quantum error-correcting code, for example, the actual instructions that are being sent to the individual qubits (e.g., qubits 515A-n). As part of the Kirigami code process, the 3D lattice, with the CCZ gate applied, can be reduced/compactified to a 2D form. In an embodiment, steps 120 and 130 can be performed in combination.

At 140, with the original 2D quantum error-correcting code having been transformed by the 3D Kirigami code process with the CCZ gate applied, a lattice surgery process can be performed to map the transformed code (e.g., now in a 2D form) to an ancilla Kirigami code (e.g., code 1330A via ancilla qubits 1420A-n), which enables the transformed code to be mapped back to another copy (e.g., second quantum error-correcting code 1687), wherein the copy can be a version of the original 2D quantum error-correcting code transformed by the CCZ gate. Essentially, the CCZ logical gate information applied to the Kirigami quantum error-correcting code can be transferred to another copy (e.g., another Kirigami code).

At 150, one or more measurement sequences (e.g., FIG. 14D) can be performed on a set of qubits represented by the original 2D quantum error-correcting code and/or the Kirigami quantum error-correcting code to enable a return to the original 2D quantum error-correcting code, if required.

Figure 16A:
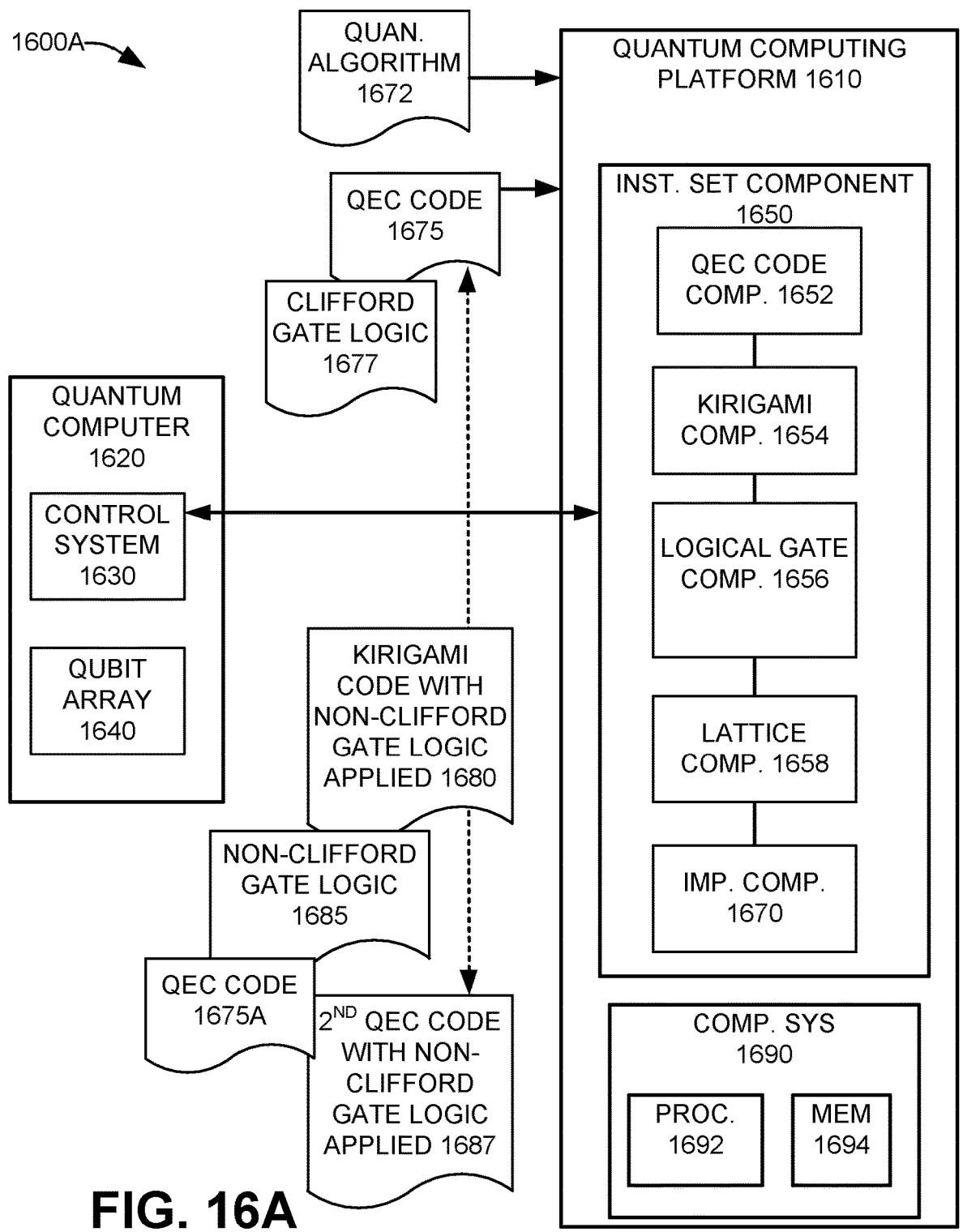
FIG. 16A illustrates a system configured to implement a quantum error-correcting code including a non-Clifford gate, in accordance with various embodiments presented herein.
Figure 16B:
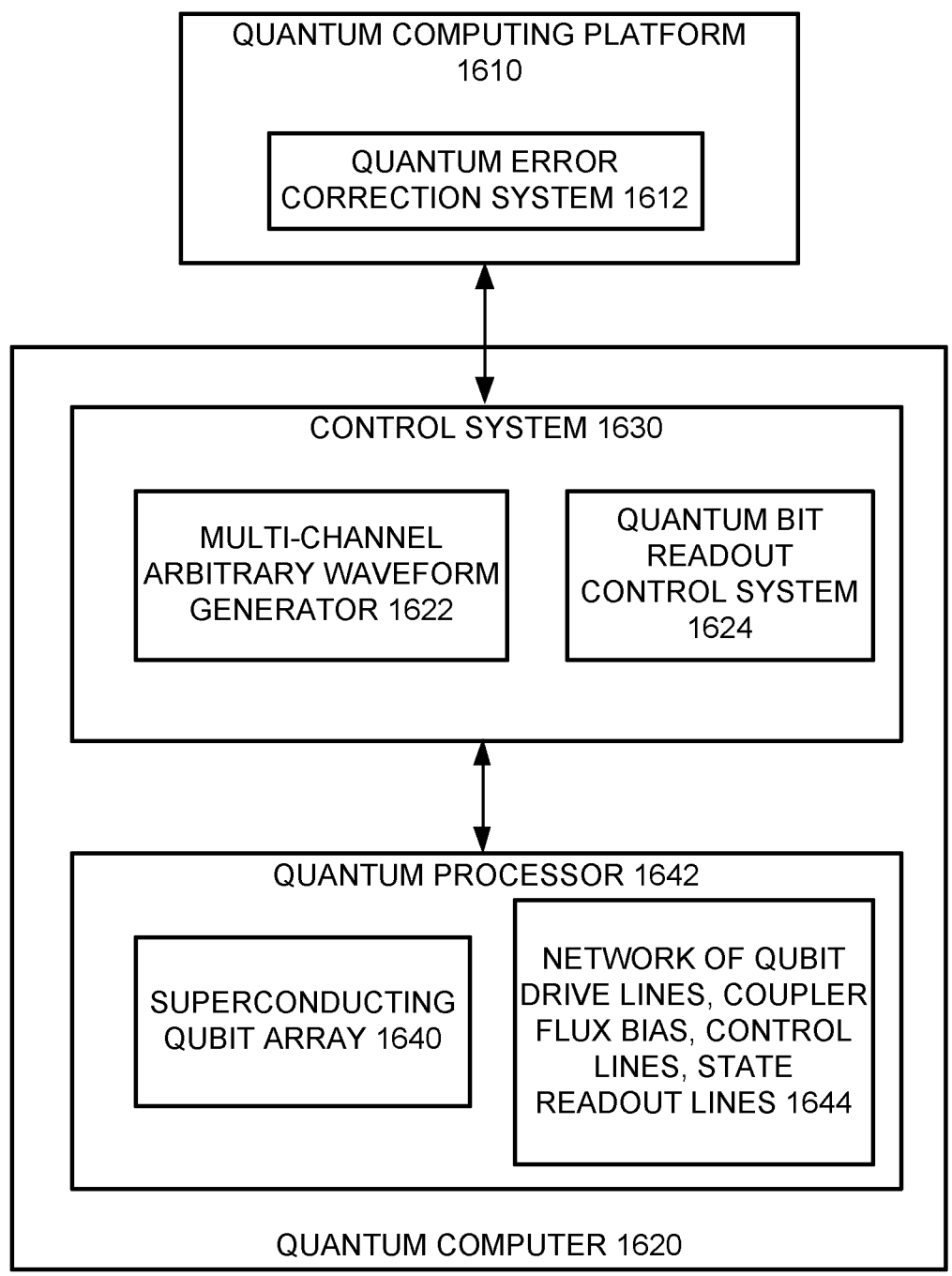
FIG. 16B further illustrates a quantum computing system, according to at least one embodiment.

At 160, the surface code (e.g., with the non-Clifford gate) can be applied to a quantum processor (e.g., quantum processor 1642, per FIGS. 16A-B). Per the various embodiments presented herein, the application of a 2D QEC having the non-Clifford gate incorporated therein, can improve the performance of the quantum computing system (e.g., quantum computing systems 1600A-B presented in FIGS. 16A-B) by, in a non-limiting list: (a) reducing faults, which can further (b) reduce the number of shots required by the quantum computing system (e.g., which can further reduce the total quantum computation time) to achieve a viable result Accordingly, per the foregoing, and as described with regard to the various embodiments presented herein, an operation can initiate with a 2D surface code (e.g., based on an error correction code) and end with a 2D transformed surface code to which a logical gate (e.g., a non-Clifford CCZ gate) has been applied/incorporated. By transforming the 2D surface code to 3D form, the CCZ gate can be applied (with that version of the transformed quantum error-correcting code saved), followed by removing the transformation to return the original quantum error-correcting code to which any Clifford gates can be subsequently implemented to the instruction set. In an embodiment, the 2D surface code and the 3D Kirigami code can be Abelian in nature, also known as commutative, regarding an operation applied to two or more elements does not depend on the order in which the elements are written/order of application of the operation.

It is to be appreciated that the various steps presented in FIG. 1 can be performed classically by a quantum computing platform, e.g., as presented in FIG. 16B, and in particular, quantum computing platform 1610. In an embodiment, the steps 110-140 can be performed classically by a quantum computing platform 1610. In a further embodiment, the steps 150 and 160 can be performed by the quantum computer 1620, and further at the qubit array/lattice 1640.

2. 3D Surface Code(s)

The various embodiments presented herein have a foundation in a 3D surface code/toric code, as described by the following parent Hamiltonian, per Eqn. 1:

$$H_{TC(3)} = -J\sum_{v} A_v - J\sum_{p} B_p,$$ Eqn. 1 with $$A_v = \bigotimes_{j \in \{e_v\}} X_j, B_p = \bigotimes_{j \in \{e_p\}} Z_j.$$

whereby:

$A_v$ is the vertex stabilizer with all the Pauli-X operators supported on the edges connected to the vertex v (e.g., as denoted by $e_v$), and $B_p$ is the plaquette/face stabilizer with all the Pauli-Z operators supported on the edges surrounding the plaquette p (e.g., denoted by $e_p$).

Violation of $A_v$ corresponds to e-particle excitations, while violation of $B_p$ corresponds to m-loop excitations.

Figure 2A:
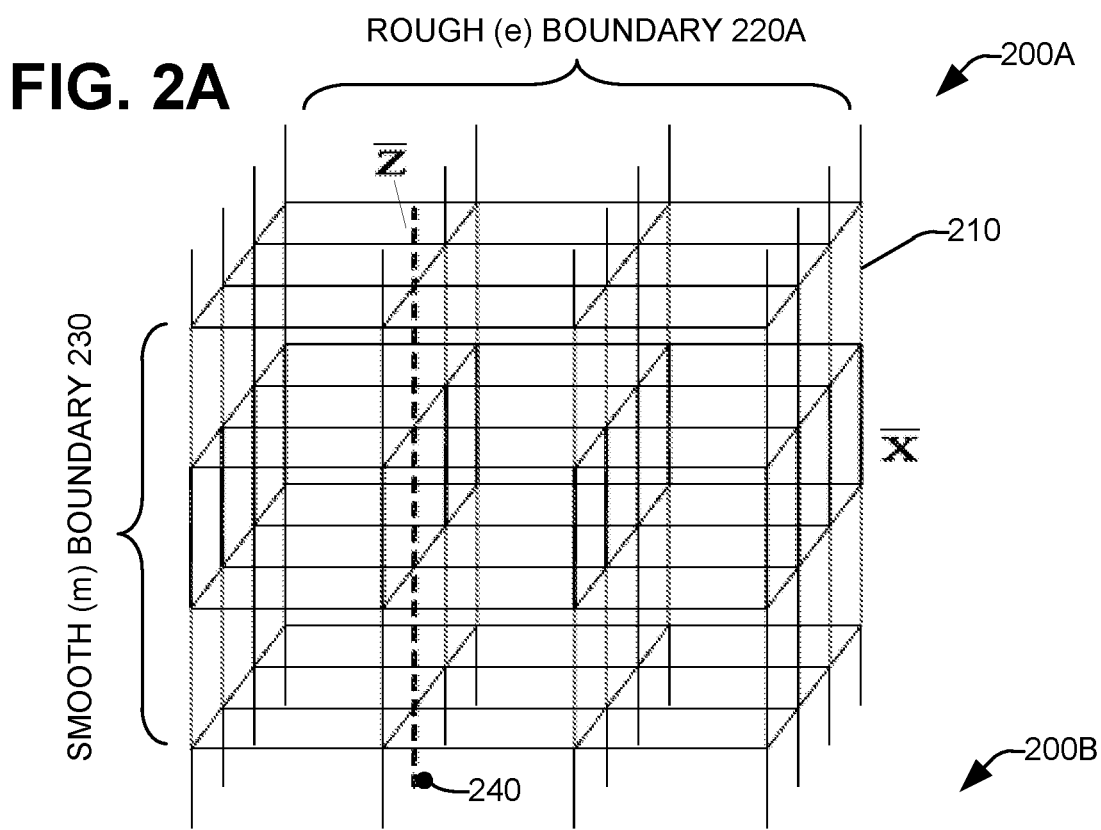
FIGS. 2A and 2B present schematics illustrating an example 3D surface code, in accordance with one or more embodiments.
Figure 2B:
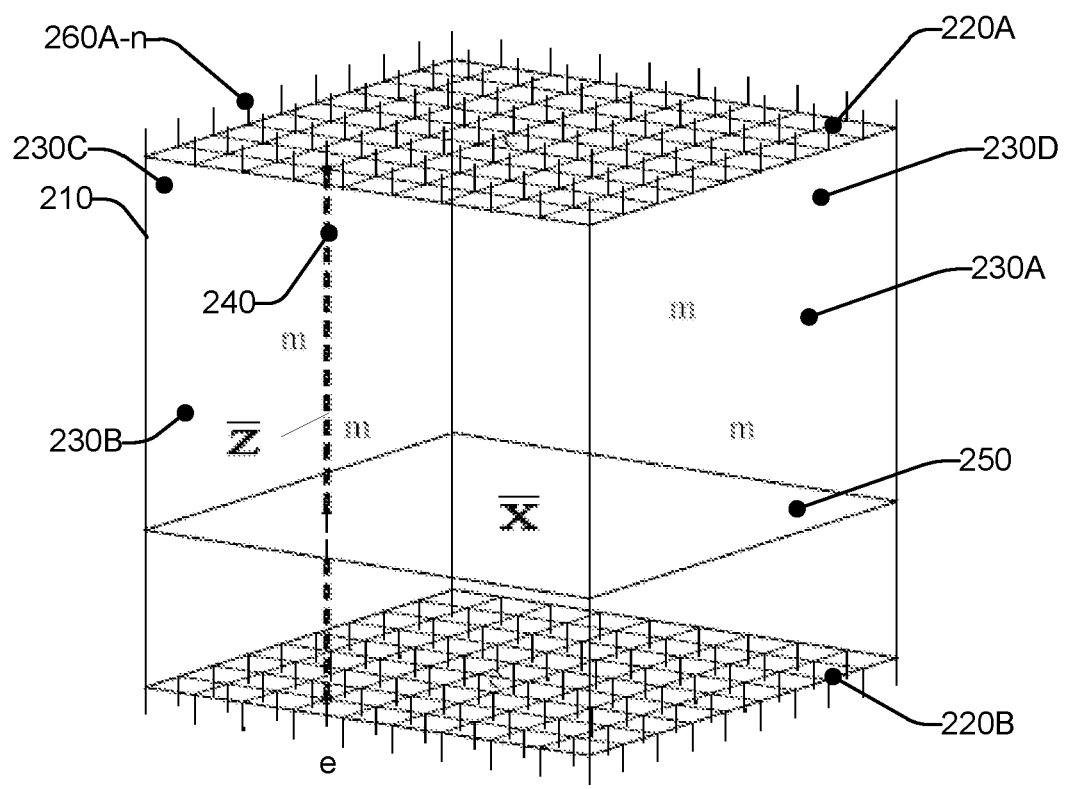

FIGS. 2A and 2B, schematics 200A-B illustrates an example 3D surface code, in accordance with one or more embodiments. FIGS. 2A and 2B present schematics illustrating a lattice 210 comprising an e-boundary 220 (also known as a rough boundary region/rough boundaries) and a m-boundary region 230A-D (also known as a smooth boundary region/smooth boundaries). Lattice 210 can be considered to comprise codimension-1 (2D) gapped boundaries associated with the Hamiltonian presented in Eqn. 1, whereby the lattice 210 is a simple type of gapped boundary, with the e-boundary 220 configured to condense the e-particles and hence let logical Z string 240 be terminated, and the m-boundary 230 configured to condense the m-strings and logical X membrane 250 being terminated. As further shown, the e-boundary 220 can include numerous dangling edges 260A-n, wherein the dangling edges 260A-n can be referred to as "nails", as further described. Per FIG. 2B, the lattice 210 can be depicted as a cube comprising 4 surfaces 230A-D which are m-boundaries 230A-D forming the side surfaces of the cube, and further, top and bottom surfaces 220A and 220B which are the e-boundaries 220A-B.

3. Compactification of 3D Surface Codes

Figure 3B:
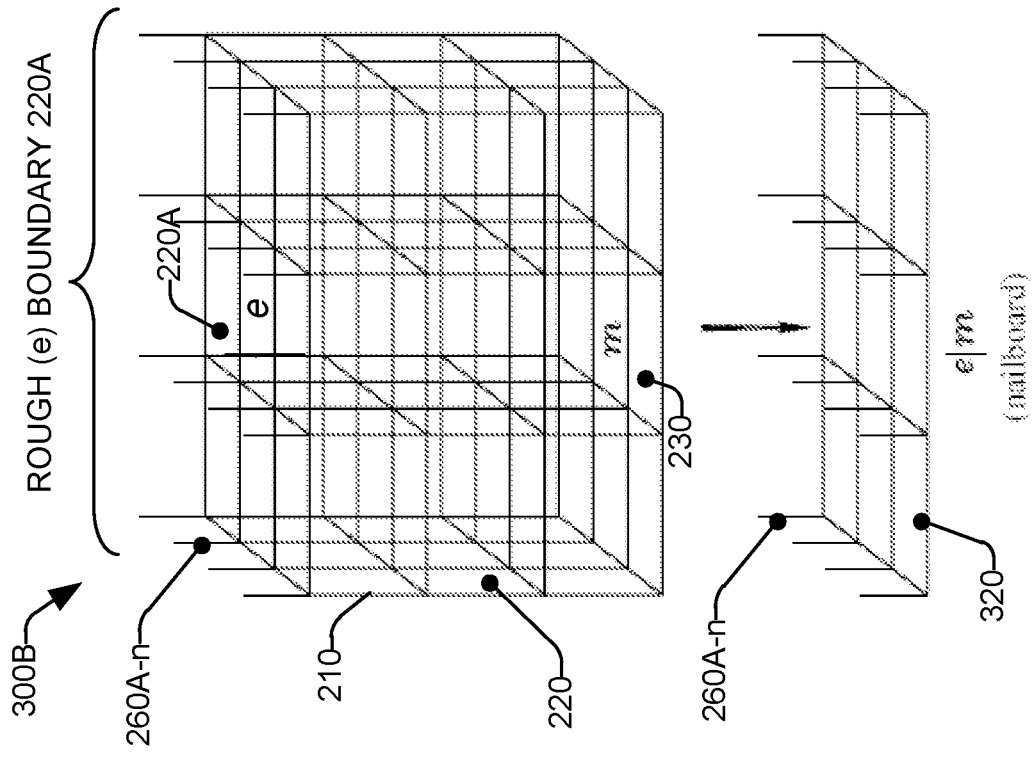
FIGS. 3A-B present schematics illustrating a 3D surface code being compactified, in accordance with an embodiment.
Figure 3A:
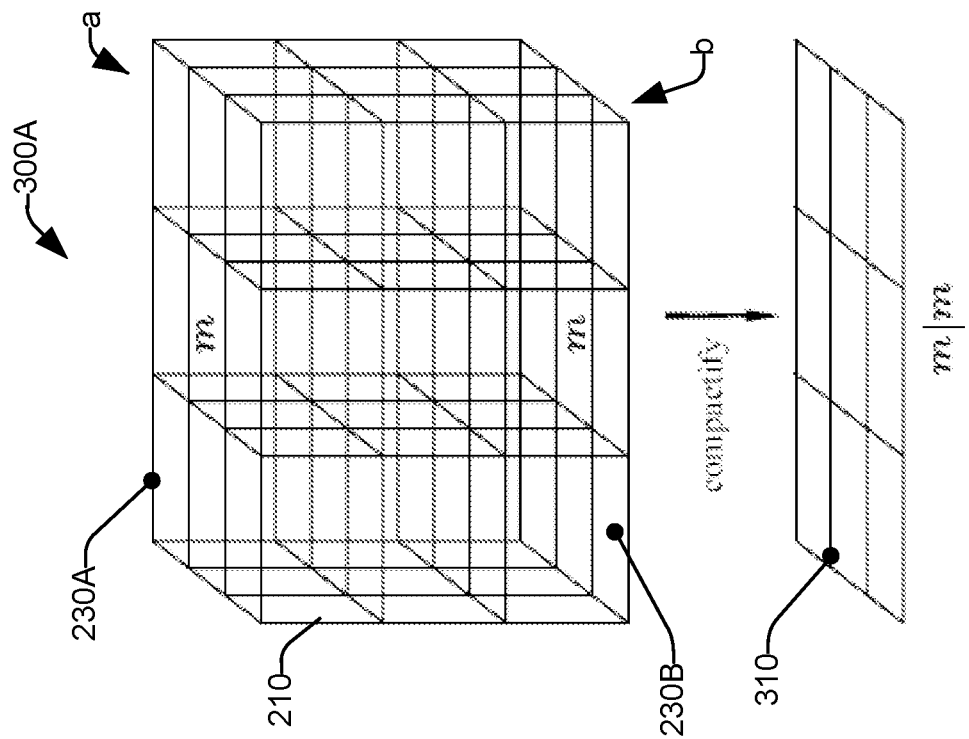

FIGS. 3A-B and schematics 300A-B illustrate a 3D surface code being compactified, in accordance with an embodiment. A 3D surface code lattice can be compactified by shrinking the thickness of the 3D surface code along the z-direction (e.g., in direction of Z string 240 in FIG. 2), such that the compactified system is compacted to live in the x-y plane. Depending on the types of 2D gapped boundaries on the top (denoted by a) and bottom (denoted by b), it is possible to obtain a compactified 2D system denoted by a|b. FIG. 3A illustrates an m-boundary region 230A/230B of lattice 210 being compacted, while FIG. 3B illustrates an e-boundary region 220 and a m-boundary 230 of lattice 210 being compacted. Initially taking into consideration just the e and m types of 2D boundaries, and focusing on the two types of compactified patches:

(i) a first type patch (1) 310, per FIG. 3A, denoted as m|m can be generated from a m-boundary region 230A/B. The first type patch 310 comprises the usual 2D toric (surface) code, i.e., m|m=$TC^{(2)}$, since a 2D toric code can be viewed as a single-sheet thin 3D toric code with top and bottom boundaries being the smooth m-boundaries 230A and 230B without any dangling edges 260A-n along the z-directions, as illustrated in FIG. 3A.

(ii) a second type patch (2) 320, per FIG. 3B, denoted as e|m (or m|e) can be generated from an e-boundary region 220 in conjunction with m-boundary region 230. It is to be noted that the e|m and m|e of the second patch 320 are related by an up-down inversion. The patch 320 can also be referenced as a "nailboard" as shown in the lower panel of FIG. 3B, whereby the "nails" are the dangling edges 260A-n sticking out of the plane. The nailboard-type patch 320 can be considered to be equivalent to a 2D cluster state, belonging to the class of symmetry-protected topological (SPT) states.

4. The Kirigami Code

FIGS. 4A-G, schematics 400A-G, present respective stages and concepts regarding application of a Kirigami technique as part of compactification of a 3D surface code to a 2D surface code, in accordance with various embodiments.

The following initiates with a setup of three copies of 3D surface codes, to which a transversal logical CCZ gate can be applied. The boundaries in the setup are of type ($m_1$, $m_2$, $e_3$) and its permutations (of the layer labels).

A Kirigami Code is now introduced, wherein the Kirigami Code process can comprise a cut-and-fold procedure, as further described, per 3.1. Cut and 3.2. Fold:

4.1. Kirigami Code Cut

As part of the Kirigami Code process, a Kirigami cut process can involve a hole 410 being cut out of lattice 210, wherein the hole 410 has an m-boundary inside each copy of the three 3D surface codes, as shown in FIG. 4A. In an embodiment, the creation and expansion of the hole 410 can be considered to be a process where an inner portion of the lattice 210 is removed, to further create a thin-walled topological arrangement, as further described. As shown in the progression from FIG. 4A to FIG. 4C, the size of the hole 410 can be gradually increased such that the boundary wall of hole 410 touches (per FIG. 4C) the external boundary of the lattice 210, and thus becomes merged into a single layer, from which it is possible to obtain a 2D surface code living on the boundary of a cube (e.g., analogous to a thin walled cube), which is topologically equivalent to a sphere ($S^2$), as illustrated in FIG. 4C. FIG. 4B presents an intermediate state as the hole 410 is enlarged, as shown, the logical X membrane 250 is being further reduced until it becomes a string element 250 around the wall of the hollow lattice 210, per FIG. 4C. The process presented in FIGS. 4A-C can be considered to be equivalent to the compactification procedure presented in FIGS. 3A-B. As shown in the copy of the 3D surface code presented in FIGS. 4A-C, the top and bottom boundaries are compactified into the e|m patch 320 (e.g., as represented by the "nails" 260A-n representing X, while the other four sides are respectively compactified into a m|m patch 310, whereby a m|m patch 310=$TC^2$, e.g., a single layer of 2D toric code. For the other two copies, the e|m patches 320 are located on the front/back boundaries and the left/right boundaries respectively. As illustrated in FIG. 4D, when the stack code of three copies is considered, the stack code has the following boundary types:

($e_1|m_1$, $m_2|m_2$, $m_3|m_3$) on the top (surface A) and the bottom (not shown) per boundary 463;

($m_1|m_1$, $e_2|m_2$, $m_3|m_3$) on the front (surface B) and the back (surface E) per boundary 473; and ($m_1|m_1$, $m_2|m_2$, $e_3|m_3$) on the right (surface C) and the left (surface D) per boundary 483.

4.2. Kirigami Code Fold

The 3D cubic geometry of FIG. 4D can be folded into a 2D geometry by doubling the number of layers from 3 to 6.

Given that concern is focused on topological equivalence, it is possible to deform each of the boundaries on the cube of FIG. 4D and change the respective size of the boundaries. The system can be folded along the dashed lines 490 into the folded 2D code presented in FIG. 4E, which, as shown, comprises five regions (A to E), with six layers in each region. The four side boundaries on the cube of FIG. 4D become two copies of themselves (6 layers in total) in region B, C, D and E of FIG. 4E. As shown, during the deformation and folding process from the 3D code to the 2D code:

3D surface A (and F, not shown), boundary 463 becomes a 2D patch/region 462, 3D surface B (and E), boundary 473 becomes a 2D patch/region 472, and 3D surface C (and D), boundary 483 becomes a 2D patch/region 482.

For example, the patches in region B and E are transformed by the folding operation as $(m_1|m_1, e_2|m_2, m_3|m_3) \rightarrow (m_1|m_1, e_2|m_2, m_3|m_3, m_4|m_4, m_5|e_5, m_6|m_6)$. The top and bottom boundary on the cube are merged into region A/462 of FIG. 4E, and the higher defect is doubled into $(e_1|m_1, m_2|m_2, m_3|m_3, m_4|m_4, m_5|m_5, m_6|e_6)$. It is to be appreciated that it is possible to further freely deform the geometry of the higher defects as shown in FIG. 4F, with the respective regions A, B, C, D, E represented (note, the reduced scale of FIG. 4F for illustration purposes, while FIG. 4F can have the same dimension(s) as FIG. 4E).

Figure 4G:
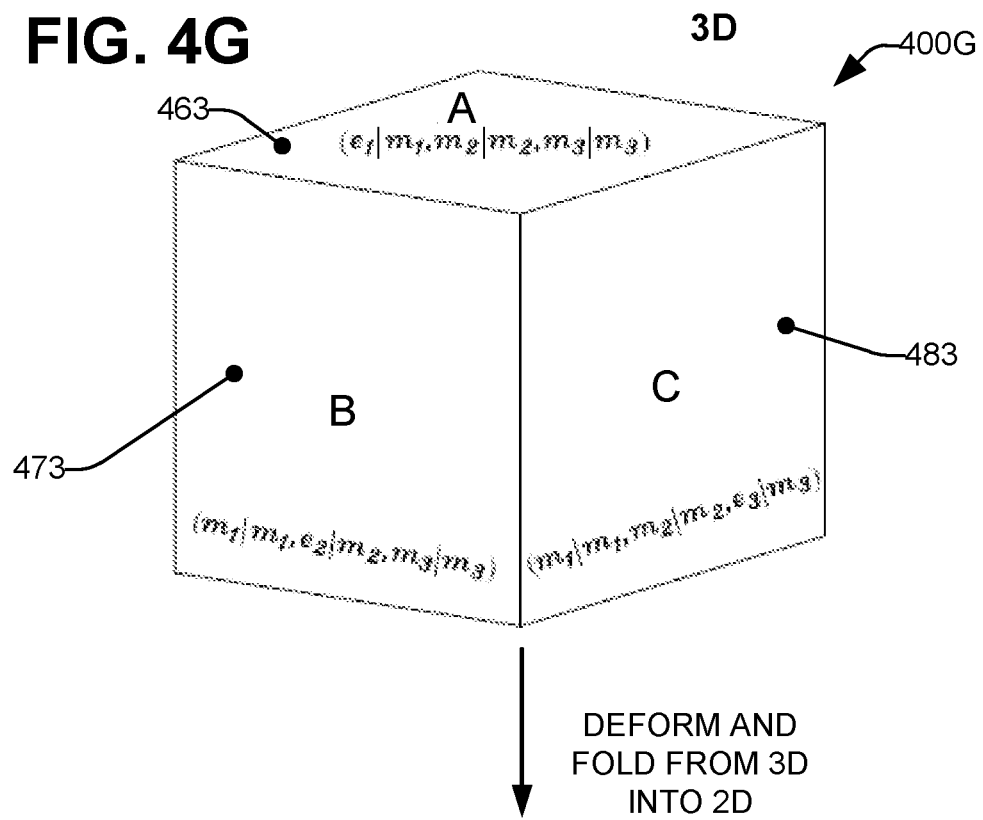
Figure 4H:
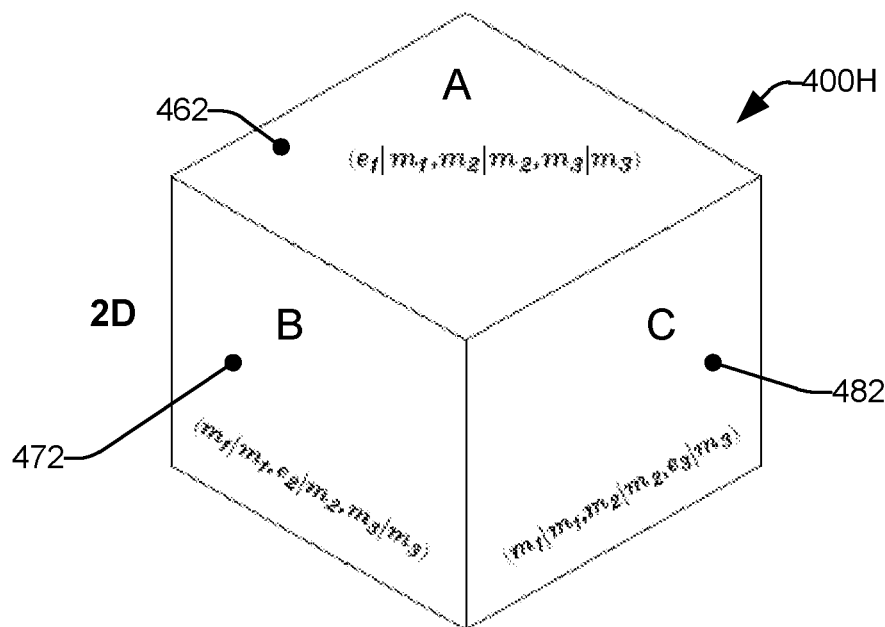

FIGS. 4G and 4H, schematics 400G-H, present a further simplified version of the Kirigami code process, in accordance with an embodiment. For the purpose of performing non-Clifford logical CCZ gate, such an approach essentially only requires three surfaces on the 3D cubic geometry with three different types of patches as labeled A (463), B (473), C (483), per FIG. 4G. A further Kirigami deform-and-folding procedure leads to transformation of the 3D quantum error-correcting code lattice 400G to a 2D quantum error-correcting code 400H, as represented by patches A (462), B (472), C (482) in FIG. 4H. (Note it is to be appreciated that while FIG. 4H looks like a 3D depiction, the respective regions A, B, and C, form a 2D shape). An advantage with utilizing the foregoing approach is that the resulting 2D code 400H just has three layers rather than six layers, which can significantly lower the engineering difficulty/complexity.

4.3. Lattice Construction of the Kirigami Code

Generally, the following approach can comprise initial conditions comprising the lattice models of 3 copies of 3D surface codes with transversal logical CCZ gate, wherein the system comprising the 3D surface codes+CCZ gate can be subsequently compactified to the 2D Kirigami code via punching a large hole 410 in the lattice 210, wherein the hole 410 can have a $(m_1, m_2, m_3)$ boundary, as previously described.

5. Lattice Model of Three Copied of 3D Surface Code and $(m_1, m_2, m_3)$ Boundary FIGS. 5A-B, schematic 500, illustrates a constructed stack of 3D surface codes enabling implementation of a transversal CCZ gate in the bulk, in accordance with an embodiment. Per the arrangement illustrated in FIG. 5A, each vertex contains 3 qubits 515A-n belonging to the 3 copies of 3D surface codes. The three copies will be asymmetric such that:

i) copy 1 (the conventional 3D surface code equivalent to those illustrated in FIG. 2) will have weight-6 X stabilizers in the bulk (volumes/3-cells 510A-n in FIG. 5A), while ii) copy 2 and copy 3 have weight-12 X stabilizers (given in 3-cells 520A-n and 3-cells 530A-n).

The foregoing arrangement can be made in order to guarantee that when the mutual intersection of one X stabilizer from each of the three code copies is identified, the intersection is always even. It is possible to verify this condition by checking that a stabilizer 520A-n and a stabilizer 530A-n only ever intersect along a weight-4 face and all such faces will intersect their neighboring octahedra 510A-n at an even number of qubits 515A-n. The Z stabilizers are given by 2-cells (faces) the intersection of the complementary 3-cells (volumes).

Figures 5A, 5B:
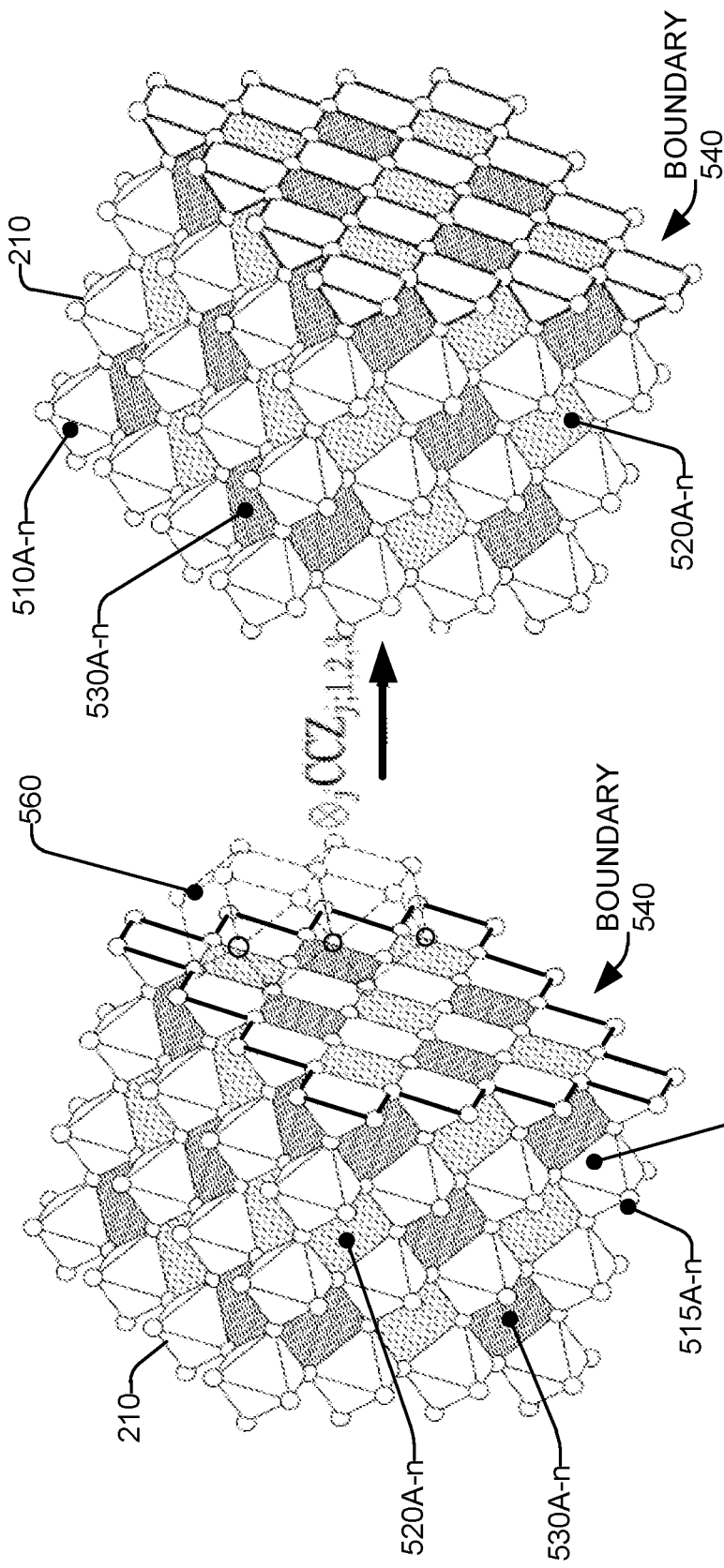
FIGS. 5A-B present schematics illustrating a constructed stack of 3D surface codes enabling implementation of a transversal CCZ gate in the bulk, in accordance with an embodiment.

For example, for copy 1, the Z stabilizers in the bulk are given by the respective weight-4 square faces 520A-n and 530A-n in FIG. 5A. While the Z stabilizers in copy 2 and 3 (with volumes 520A-n and 530A-n as X-stabilizers) in the bulk are given by the weight-3 triangle faces on the surface of the volumes 520A-n and 530A-n respectively.

As shown, FIG. 5A presents an illustration of a boundary 540 (e.g., comprising a $(m_1, m_2, m_3)$-boundary) in a stack of 3 copies of 3D surface codes. The boundary 540 is on the right of the lattice 210 (as marked by the heavy lines), where the support of the stabilizers is reduced. The surface code whose X stabilizers are given by the octahedra 510A-n have the support of their stabilizers reduced to be weight-5. While the stabilizers 520A-n and 530A-n, of codes 2 and 3, have weight-4 face stabilizers on the boundary 540. For illustrative purposes, the dotted line structures 560 shown in FIG. 5A depict how the stabilizers would normally have larger support, with these qubits 560 being faded out, per the dotted line.

FIG. 5B illustrates, that after the application of the CCZ gate, $\otimes_j CCZ_{j;1,2,3}$, the bulk X stabilizers are preserved while those whose support were cut at the boundary of the hole are now transformed to be of the form explained in FIG. 6, below.

FIGS. 6A-C, schematics 600A-C, present an example of the action of application of a transversal CCZ gate on the X stabilizers of a surface code, in accordance with an embodiment. Per FIG. 6A, the action of a transversal CCZ gate (a) is demonstrated on the weight-6 stabilizers 510A in code block 1. Under the action of the CCZ gate, Pauli X on one qubit is mapped to a product of X and CZ on the other two code copies, product 610 (represented by the heavy line depiction). It is possible to break this product 610 into two components: 510A comprising the original X stabilizer and component 620 (indicated by the broken like) with qubits 625 being a resulting tensor product of CZ on the other two code blocks.

Per FIG. 6B, the action of CZ on the qubits in the octahedron (e.g., octahedrons 510/610) can result in a logical identity in the bulk as the support of this operator mutually overlaps with two qubits 670 from the intersection of any two weight-12 stabilizers 640 and 650.

Per FIG. 6C, on the boundary, the overlap of the weight-5 CZ operator will only overlap with a single qubit 670 from the intersection of the faces 640 and 650, as such this does not satisfy the requirements to be a logical identity operator.

The construction of the exotic $(m_1 s_{2,3}^{(2)}, m_2 s_{3,1}^{(2)}, m_3 s_{1,2}^{(2)})$-boundary is now introduced, which will later lead to the magic defect after application of the compactification process (e.g., as previously described). The process of verifying that the CCZ gate no longer preserves the boundary stabilizers of the ($m_1$, $m_2$, $m_3$)-boundaries becomes simplified. In considering the weight-4 face stabilizers on the boundary of the hole 410, the weight-4 face stabilizers on the boundary of the hole 410 intersect each of the other weight-4 stabilizers on the boundary of different stabilizers at a single qubit 515A-n. Accordingly, the requisite condition for the preservation of the X stabilizers will no longer be satisfied as this overlaps with any of the weight-5 stabilizers 510 at a single location. This is visually represented by the operator 620 in FIG. 6C. Upon the completion of application of the transversal CCZ gate, the resulting stabilizers will remain the same in the bulk however, the boundary stabilizers will undergo the following mapping:

$$\bigotimes_j CCZ_{j;1,2,3}: \bigotimes_{j \in A^{h.b.}_{i;a}} X_{j;a} \to \bigotimes_{j \in A^{h.b.}_{i;a}} X_{j;a} \to \bigotimes_{k \in A^{h.b.}_{i;a}} CZ_{k;b,c},$$

$$\bigotimes_{j \in B^{h.b.}_{i;a}} Z_{j;a} \to \bigotimes_{j \in B^{h.b.}_{i;a}} Z_{j;a},$$

where $A_{i,\alpha}^{h.b.}$ is a boundary stabilizer of the hole 410. In the bulk, the term on the right-hand side $$\bigotimes_{k \in A^{bulk}_{i;a}} CZ_{k;b,c}$$

would be equivalent to logical identity, however this is no longer the case on the boundary (e.g., boundary 540), as such there is no way to separate this term out from the modified stabilizer. Thus, the stabilizers along the boundary now must include a CZ supported on the other two code blocks.

6. Compactify the 3D Lattice Model Down to 2D: Lattice Realization of the Kirigami Code Due to the asymmetry of the three copies of 3D surface codes (e.g., derived from 463, 473, 483), the compactified 2D Kirigami code has three different lattice types on the three different surfaces presented in FIG. 7 (note: this a replication of FIG. 4H), e.g.:

type A surface 462: ($e_1|m_1$, $m_2|m_2$, $m_3|m_3$),
type B surface 472: ($m_1|m_1$, $e_2|m_2$, $m_3|m_3$), and
type C surface 482: ($m_1|m_1$, $m_2|m_2$, $e_3|m_3$).

In particular, the type B surface 472 and the type C surface 482 can be related by a permutation of surface codes 473 and 483, and correspondingly copy (layer) 2 and 3 in the lattice construction presented in FIGS. 5A-B. Hence, in the following the lattice construction for a type A surface 462 and a type B surface 472 are presented, since a type C surface 482 can be obtained straightforwardly from type B surface through layer permutation. (note: the construction for the 6-surface version corresponding to cubic geometry in FIG. 4D is presented, where opposite surfaces are of the same type. Accordingly, the generalization to the 3-surface version presented in FIG. 4G is straightforward.)

6.1. Lattice Construction for Surface Type A

FIGS. 8A-C, schematics 800A-C illustrate the cutting of the bulk on the 3D lattice model and the construction of lattice corresponding to a first type surface, in accordance with a least one embodiment. FIGS. 8A-C illustrate cutting of the bulk (e.g., through use of hole 410) on the 3D lattice model and the construction of lattice corresponding to a type A surface 710 of FIG. 7. In FIG. 8A, the 3-cells with three regions 810, 820, 830 indicate the X stabilizers on the three copies (layers) of codes, while the 2-cells 820 and 830 (squares) on the plane indicate the Z stabilizers, in conjunction with qubits 515A-n/260A-n. In FIG. 8B, the 2-cell 850 indicates the 4-body and 3-body Z stabilizers for copy 1, in conjunction with qubits 515A-n/260A-n. In FIG. 8C, the 2-cell 860 indicates the Z stabilizers for copy 2, in conjunction with qubits 515A-n/260A-n. Copy 3 has essentially the same pattern as copy 2 up to a lattice translation due to the symmetry between cells 820 and 830, per FIG. 8A.

FIGS. 9A-C, schematics 900A-C, illustrate a 2D layout representation of a compactified (from 3D to 2D) Kirigami code. Since the system has been compactified to 2D, it is possible to present the Kirigami code on an entirely 2D layout, as represented in FIGS. 9A-C. FIG. 9A presents a panel 900A illustrating the alignment of the 3 copies of codes indicated by a solid thin line 920 (copy 3), and a broken thin line 930 (copy 2), and a dark bold line 940 (copy 1) respectively. Further, the qubits 515A-n/260A-n are represented in FIGS. 9A-C by solid circles or squares. Qubits 515A-n/260A-n sitting on top of each other or put together in a dashed circles 910 are aligned, and hence will be acted on by the transversal CCZ gates in the protocol implementing the logical CCZ gate, as described further herein. As shown, the stacked nature/representation of the layout of FIG. 9 is broken down into FIG. 9B=lattice corresponding to copy 2, and FIG. 9C=lattice corresponding to copy 1.

FIG. 9B presents a panel 900B illustrating the lattice of copy 2 (820) alone, which is a square-octagon surface code with the X stabilizers 952 located on the square plaquettes 950 and octagon plaquettes 955 and the Z stabilizers 962 located on the vertices 960. Due to symmetry, copy 3 (830) also corresponds to the square-octagon surface code represented in FIG. 9B.

FIG. 9C presents a panel 900C illustrating the lattice corresponding to copy 1 which further corresponds to the nailboard lattice (elm) shown in the lower panel illustrated in FIG. 3B. The circles 970 represent the normal qubits 515A-n in the patch/plane 320 while the squares 980 represent the qubits 260A-n on the "nail" edges sticking out of the patch/plane 320 as depicted in FIG. 3B. The X stabilizers are 5-body stabilizers centered on each vertex corresponding to the "nail" qubits 260A-n. There are 4-body Z stabilizers located on each plaquette and 3-body Z stabilizers aligned along a horizontal or vertical line. The nailboard model (e.g., surfaces 220A-n) is equivalent to a cluster state, which can be seen from applying a Hadamard transformation on all the "nail" qubits 260A-n.

6.2. Lattice Construction for Surface Type B (and Surface Type C)

FIGS. 10A-C, schematics 1000A-C illustrate the cutting of the bulk on the 3D lattice model and the construction of lattice corresponding to a second type surface, in accordance with a least one embodiment. FIGS. 10A-C, schematics 1000A-C, illustrate cutting of the bulk (e.g., with hole 410) on the 3D lattice model and the construction of lattice corresponding to type B surface 720 of FIG. 7.

Per FIG. 10A, the 3-cells combining 1010, 1020, 1030 indicate the X stabilizers on the three copies (layers) of codes. Further, the 2-cells 1020 (squares) on the plane indicate the Z stabilizers in copy 2. Additionally, the dots 1015 represent the decoupled qubits in copy 1 which are fixed at the +states.

Per FIG. 10B, the cells 1050 indicate the Z stabilizers for copy 1.

Per FIG. 10C, the 2-cells 1070 (triangles) indicate the 3-body Z stabilizers.

FIGS. 11A-C, schematics 1100A-C, present the corresponding 2D layout via the Kirigami code, in accordance with an embodiment. FIG. 11A presents a panel 1100A illustrating the alignment of the 3 copies of codes, copy 1, copy 2, copy 3, indicated by indicated by a solid thin line 920 (copy 3), and a broken thin line 930 (copy 2), and a dark bold line 940 (copy 1) respectively. Qubits 515A-n/260A-n are represented by any of circle, square or diamond shapes 1110. For representation, qubits 515A-n/260A-n sitting on top of each other or put together in a dashed circles 1115 are aligned.

FIG. 11B presents a panel 1100B illustrating the lattice 1150 of copy 3 alone. Lattice 1150 comprises normal qubits 515A-n (circles) and "nail" qubits 260A-n (squares). As shown in FIG. 11B, lattice 1150 includes 8-body X stabilizers 1154 located on each square corresponding to 1030, 3-body Z stabilizers 1160 on each triangle corresponding to 1070, and 2-body Z stabilizers 1164 on the endpoints of each dashed line.

FIG. 11C presents a panel 1100C illustrating the lattice 1180 of copy 1 alone, which comprises the usual surface code consisting of qubits 515A-n (represented by circles) plus additional decoupled ancilla qubits 1190 (represented by diamonds) which are fixed at +states. As further described, the ancilla qubits 1190 are important and necessary when performing the transversal CCZ gate.

7. Logical Gates and Domain-Wall Sweeping

Consideration is now given regarding application of a non-Clifford logical CCZ gate on the Kirigami Code. Transversal gates (e.g., such as a CCZ logical gate) can be considered to be equivalent to topological symmetries in the bulk of the topological order which is also equivalent to the sweeping of the corresponding domain walls. The corresponding domain walls (e.g., wall 1220 of FIG. 12A) of the transversal CCZ gate in three copies of 3D toric codes are denoted by $s^{(3)}$, and the transversal CZ gate in two copies of 3D toric codes are denoted by $s^{(2)}$. The two types of domain walls (e.g., wall 1220 of FIG. 12A) apply the following mapping to excitations passing through them:

$$s_{1,2}^{(2)}: m_1 \to m_1 e_2, m_2 \to e_1 m_2,$$

$$s_{1,2,3}^{(3)}: m_1 \to m_1 s_{2,3}^{(2)}, m_2 \to m_{3,1}^{(2)}, m_3 \to m_3 s_{1,2}^{(2)}.$$

The sweeping of such domain walls (e.g., wall 1220 of FIG. 12A) across the entire systems is equivalent to the following mapping of the transversal logical gates on the logical operators in the absence of boundaries (i.e., on a 3-torus):

$$\overline{CZ}_{1,2}: \overline{X}_1 \to \overline{X}_1 \overline{Z}_2, \overline{X}_2 \to \overline{Z}_1 \overline{X}_2,$$

$$\overline{CCZ}_{1,2,3}: \overline{X}_1 \to \overline{X}_1 \overline{CZ}_{2,3}, \overline{X}_2 \to \overline{X}_2 \overline{CZ}_{3,1}, \overline{X}_3 \to \overline{X}_3 \overline{CZ}_{1,2}.$$

Consideration is now given regarding the action of the topological symmetry and corresponding domain wall on the 2D (codimension-1) boundaries of the 3D surface code. The following action of the CZ domain wall $s^{(2)}$ can occur on the $(e_a, m_b)$-boundary, whereby:

$$s_{a,b}^{(2)}: (e_a, m_b) \to (e_a, e_a m_b) \equiv (e_a, m_b)$$

Owing to the $Z_2$ fusion rule $e \times e = \mathbb{I}$, a composite of $e_a$ and $e_a m_b$ becomes $m_b$ (i.e., $e_a \times e_a m_b = m_b$). Accordingly, the CZ domain wall $s^{(2)}_{a,b}$ can condense (disappear) on the $(e_a, m_b)$-boundary.

Similarly, the CCZ domain wall $s^{(3)}$ can condense on the $(m_a, m_b, e_c)$-boundary, whereby:

$$s_{a,b,c}^{(3)}: (m_a, m_b, e_c) \equiv (m_a, m_b, e_c s_{a,c}^{(2)}, s_{b,c}^{(2)})$$

$$\to (m_a s_{b,c}^{(2)}, m_b s_{c,a}^{(2)}, e_c s_{a,c}^{(2)}, s_{b,c}^{(2)}) \equiv (m_a, m_b, e_c s_{a,c}^{(2)}, s_{b,c}^{(2)})$$

$$\equiv (m_a, m_b, e_c),$$

per application of the fusion rule $s^{(2)} \times s^{(2)} = \mathbb{I}$, i.e., two CZ domain walls fuse to the vacuum.

In contrast, the CCZ domain wall $s^{(3)}_{a,b,c}$ cannot condense on the $(m1, m2, m3)$-boundary, i.e., the hole boundary of the Kirgami Code on the cubic geometry, as can be seen by the following mapping:

$$s_{1,2,3}^{(3)}: (m_1, m_2, m_3) \to (m_1 s_{2,3}^{(2)}, m_2 s_{3,1}^{(2)}, m_3 s_{1,2}^{(2)}).$$

Instead, a new magic boundary $(m_1 s_{2,3}^{(2)}, m_2 s_{3,1}^{(2)}, m_3 s_{1,2}^{(2)})$ is produced, which only condenses the product of m-string and CZ domain wall $s^{(2)}$ and hence only allows the termination of the logical operator $\overline{X}_a \overline{CZ}_{b,c}$, where a, b, c are the arbitrary permutation of 1, 2, 3.

8. Protocol of the Logical CCZ Gate

8.1. Transversal Logical Map

Figure 12A:
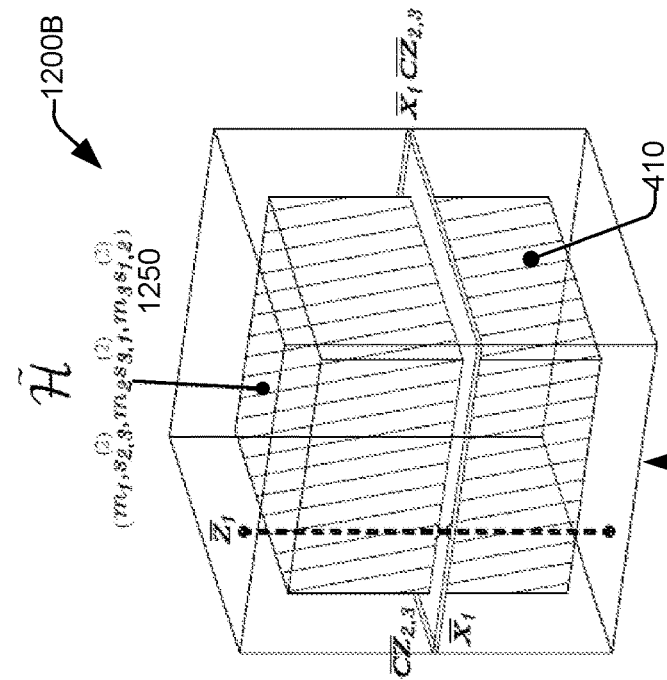
FIGS. 12A-D present schematics illustrating application of a CCZ logical gate to a Kirigami Code, in accordance with one or more embodiments.
Figure 12B:
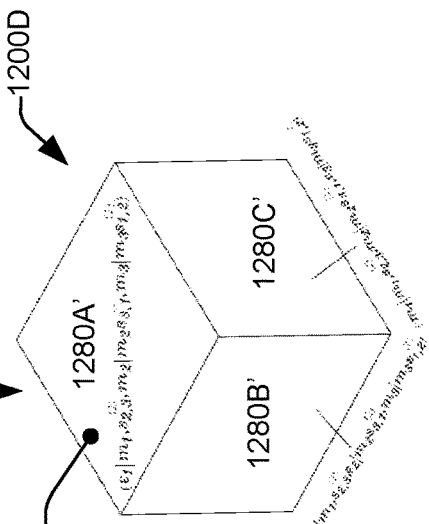
Figure 12C:
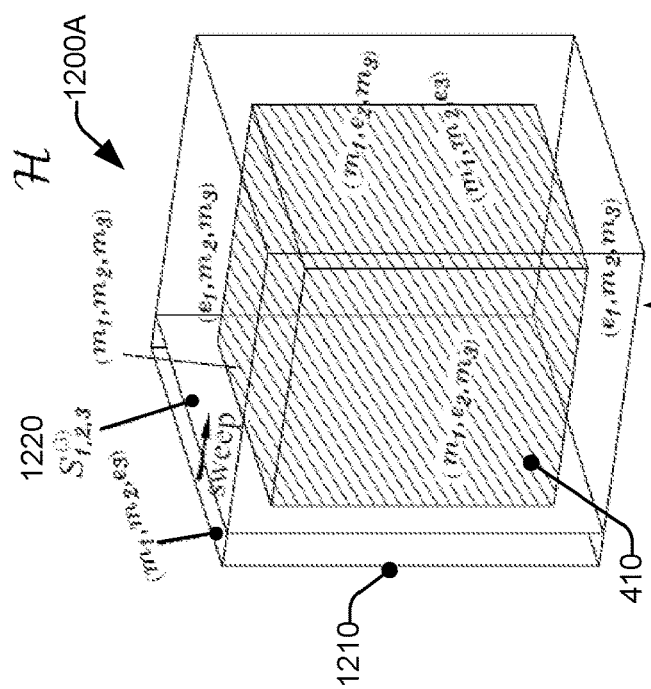
Figure 12D:
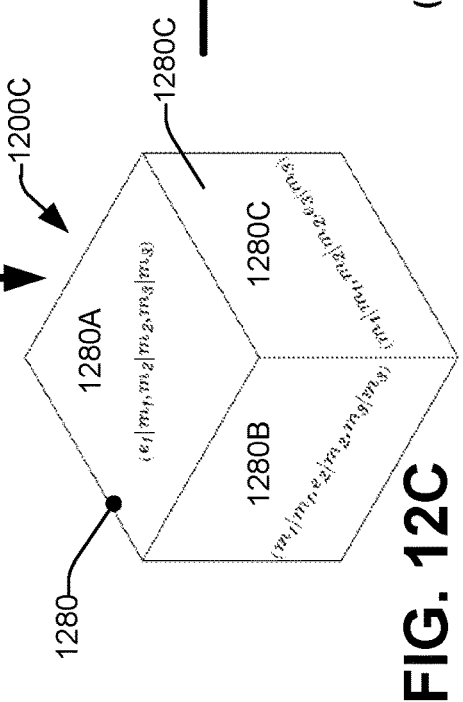

FIGS. 12A-D, schematics 1200A-D, illustrates application of a CCZ logical gate to a Kirigami Code, in accordance with one or more embodiments. FIGS. 12A and 12C represent the original code space $\mathcal{H}$, while FIGS. 12B and 12D represent a new code space (1280') $\widetilde{\mathcal{H}}$ generated by implementation of a CCZ gate, comprising surfaces 1280A', 1280B', and 1280C'.

The transversal CCZ operator $\widetilde{CCZ} = \Pi CCZ_{j;1,2,3}$ can be initially applied on the Kirigami Code, per 3D lattice 1210 (e.g., comparable to lattice 210), as initially shown in FIG. 12A. Such application can be considered to be equivalent to instantaneously sweeping the CCZ domain wall $s^{(3)}_{1,2,3}$ (e.g., wall/plane 1220 of FIG. 12A) across the entire system. Such an approach, implements a logical CCZ gate and also maps the original code space $\mathcal{H}$ to the new code space $\widetilde{\mathcal{H}}$ by producing the previously mentioned magic boundary $(m_1 s_{2,3}^{(2)}, m_2 s_{3,1}^{(2)}, m_3 s_{1,2}^{(2)})$ 1250 on the hole 410 in the 3D cubic geometry with non-Pauli stabilizers, as shown in FIG. 12B. Such an operation can be termed a transversal logical map, which corresponds to:

$$\widetilde{CCZ}: \mathcal{H} \to \widetilde{\mathcal{H}}, \widetilde{CCZ}: \overline{X}_a \to \overline{X}_a \overline{CZ}_{b,c}$$

When viewed as a 2D geometry on the surface of a cube (e.g., topologically equivalent to a sphere), this is equivalent to a new magic patch. The magic defect can be labeled:

for the top/bottom sides $(e_1|m_1 s_{2,3}^{(2)}, m_2|m_2 s_{3,1}^{(2)}, m_3|m_3 s_{1,2}^{(2)})$, 1280A→1280A' of FIG. 12C to 12D;

for the front/back sides $(m_1|m_1 s_{2,3}^{(2)}, e_2|m_2 s_{3,1}^{(2)}, m_3|m_3 s_{1,2}^{(2)})$ 1280B→1280B' of FIG. 12C to 12D; and for the left/right sides $(m_1|m_1 s_{2,3}^{(2)}, m_2|m_2 s_{3,1}^{(2)}, e_3|m_3 s_{1,2}^{(2)})$, 1280C→1280C' of FIG. 12C to 12D.

As depicted in the simplified folded geometry presented in FIG. 12C, applying transversal CCZ logical gate creates exotic patches 1280A'-C' in all regions, as shown in FIG. 12D. The label of the three patches 1280A'-C' correspond to the labels 1280A-C on the top, front, and right sides respectively on the surface of the cube 1280 discussed above.

8.2. Lattice Surgery Protocol

In order to complete the logical CCZ gate, the surface code is to be mapped to the original code space $\mathcal{H}$, which can be achieved by a lattice surgery protocol. FIGS. 13A-B, schematics 1300A-B, illustrate a lattice surgery protocol to enable the surface code to be mapped to the original code space $\mathcal{H}$, in accordance with an embodiment. Three copies of ancilla Kirigami Codes 1320A-C are prepared, which are all composed of a nailboard cluster-state patch $e_i|m_i$ (i=1,2, 3) (respectively 1330A-C) attached to a surface code patch $m_i|m_i$ (respectively 1340A-C). The three ancilla Kirigami codes 1320A-C are all prepared in the logical state $|\overline{0}\rangle$. The logical state in the original Kirigami codes 1280 with magic patches are transferred to the ancilla Kirigami codes 1320A-C. The original code space is attained without magic patches. For simplicity, only one surface code patch(es) is kept in the ancilla Kirigami code, 1320A-C. This is for the practical consideration that after performing the logical CCZ gate, it is possible to just measure out the nailboard patch 1330A-C in each ancilla in the X basis and return to a 2D surface code to perform/implement other logical Clifford gates (e.g., lower level, non-CCZ gates).

Per the following, details of the lattice surgery protocol for one ancilla patch (e.g., any one of 1320A-C) are presented, however, the protocol for the other two ancilla patches are similar. Although the logical information in the original Kirigami codes can be entangled with each others and also with other code blocks, the lattice surgery protocol is explained by denoting the logical state in the first copy as $\overline{|\psi\rangle}_1 = \alpha \overline{|+\rangle}_1 + \beta \overline{|-\rangle}_1$ for simplicity, yet the protocol can also apply in the more general entangled cases. The ancilla Kirigami code 1320A-C is prepared in the state $\overline{|0\rangle}_\alpha$.

8.3. Lattice Merging

FIGS. 14A-D, schematics 1400A-D, illustrate lattice surgery being performed, in accordance with one or more embodiments. FIGS. 14A-D depicted the lattice surgery protocol to transform the logical information inside one of the Kirigami code 1280 (bottom) in the stack of coupled Kirigami codes to an ancilla Kirigami code block 1330A (top).

Figures 14A, 14B:
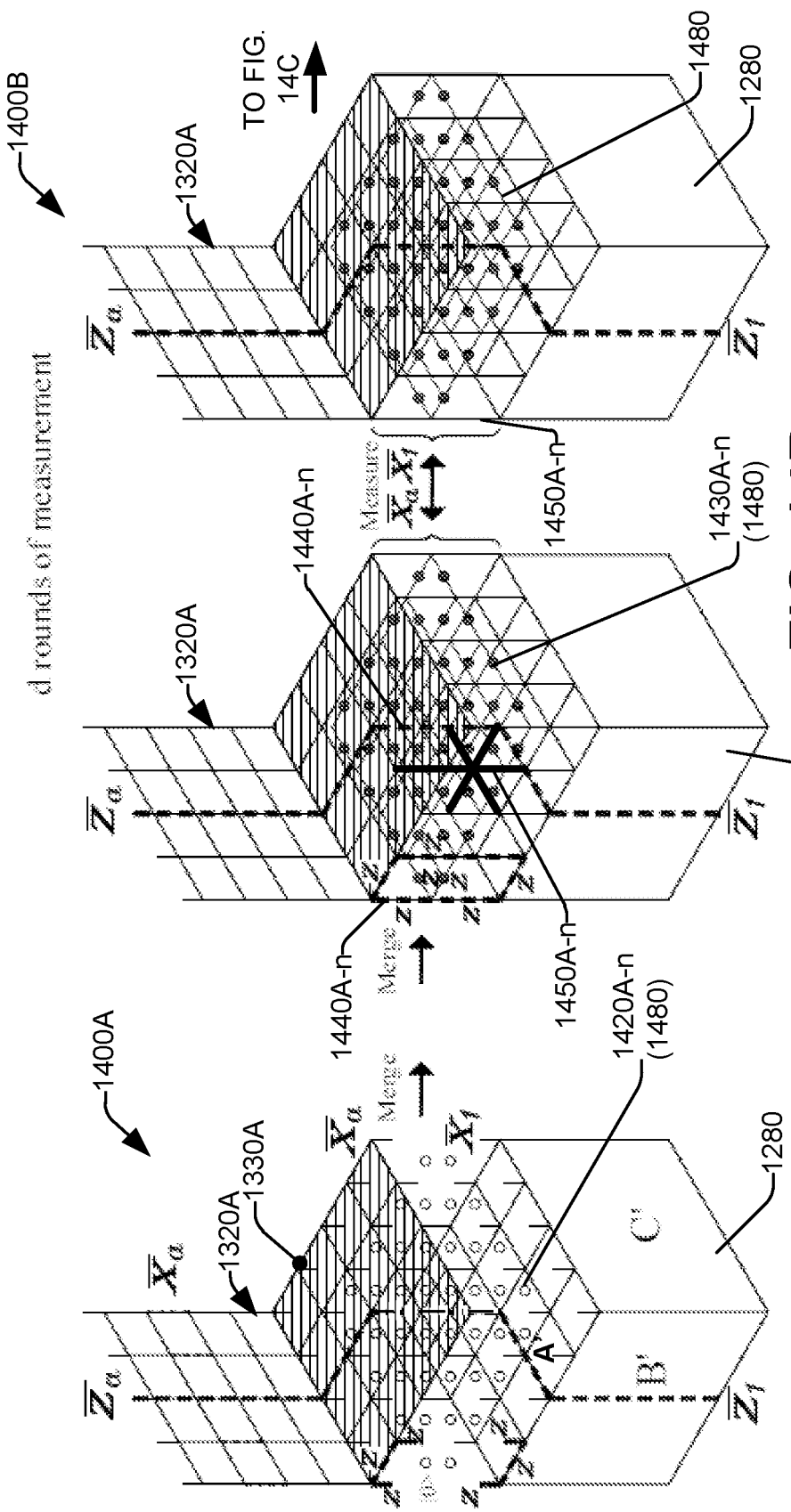
FIGS. 14A-D present schematics illustrating lattice surgery being performed, in accordance with one or more embodiments.

FIG. 14A, schematic 1400A, depicts an initialization of the ancilla qubits 1420A-n (white circles) between the two Kirigami codes 1280 and 1330A to state $|0\rangle$. As shown in FIG. 14A, the two lattices 1330A and 1280 can be merged by introducing an extra set of physical ancilla qubits $\otimes_j |j\rangle$ 1420A-n placed between the original Kirigami code 1280 and the ancilla Kirigami code 1330A. In the following, the ancilla qubits 1420A-n and ancilla qubits 1430A-n during the merging process are considered to be located at an interface 1480 between the original Kirigami code 1280 and the ancilla Kirigami code 1330A. The merging process can involve measuring the X stabilizers between the two code copies 1280 and 1330A.

FIG. 14B, schematic 1400B, presents lattice merging via d rounds of syndrome measurements and subsequent decoding. There are two types of new stabilizers introduced at the interface 1420A-n: the 4-body Z stabilizers 1440A-n with +1 eigenvalues and the 6-body X stabilizers 1450A-n with unknown eigenvalues and hence random ±1 measurement outcome. The measurement outcome of the new interface X stabilizers equivalently gives the measurement outcome of the joint parity of logical operators: $X_\alpha X_1$ (supported on the vertical edges). Hence, per FIG. 14B, besides the stabilizers in the original codes 1280 and 1330A, two new types of stabilizers, the 4-body Z stabilizers 1440A-n and 6-body X stabilizers 1450A-n are now present (e.g., the lines connecting 1330A to 1280). The eigenvalues of the 4-body Z stabilizers 1440A-n is the product of the eigenvalue of the original 3-body boundary Z stabilizers (+1) and the ancilla Z eigenvalue (+1), which remains +1 and are therefore immediately certain (in the absence of errors). On the other hand, the newly introduced X stabilizers 1450A-n have completely unknown eigenvalues.

When performing measurements, X stabilizers 1450A-n will have a random distribution of ±1 eigenvalues. The −1 eigenvalues correspond to generation of e-particle excitations. Measuring all the new interface X stabilizers 1450A-n equivalently gives the measurement outcome of the joint parity of the X-logical operators in the two codes 1280 and 1330A, e.g., $\overline{X}_1 \overline{X}_\alpha$, which is a product of all the interface X stabilizers as illustrated in the right panel of FIG. 14B. The parity $\overline{X}_1 \overline{X}_\alpha = 1(-1)$ corresponds to even (odd) number of e-particle excitations at the interface (e.g., at 1430A-n). To ensure the fault tolerance of the protocol in the presence of measurement errors, d rounds of syndrome measurements are performed. During these d rounds, the vertex stabilizers at the boundary of the holes in the original fractal code block will now be non-Pauli stabilizer due to the action of the transversal gate, however the vertex stabilizers at the boundary of the holes in the original fractal code block can still be measured fault-tolerantly using syndrome extraction circuits that mirror that in the usual local Pauli stabilizer model. After d rounds of measurements, it is possible to fault-tolerantly decode and correct the errors and hence clean up all the e-particle excitations at the interface (e.g., at 1430A-n).

Figure 14D:
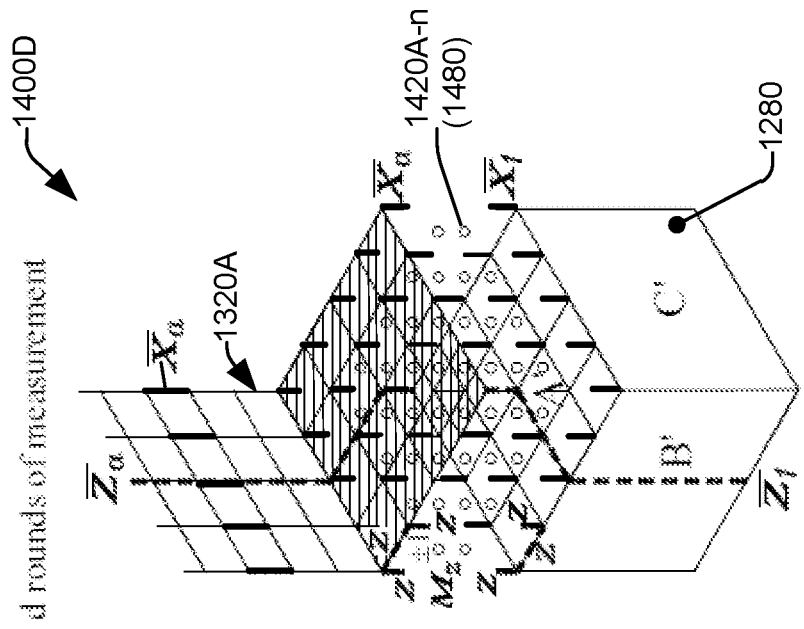
Figure 14C:
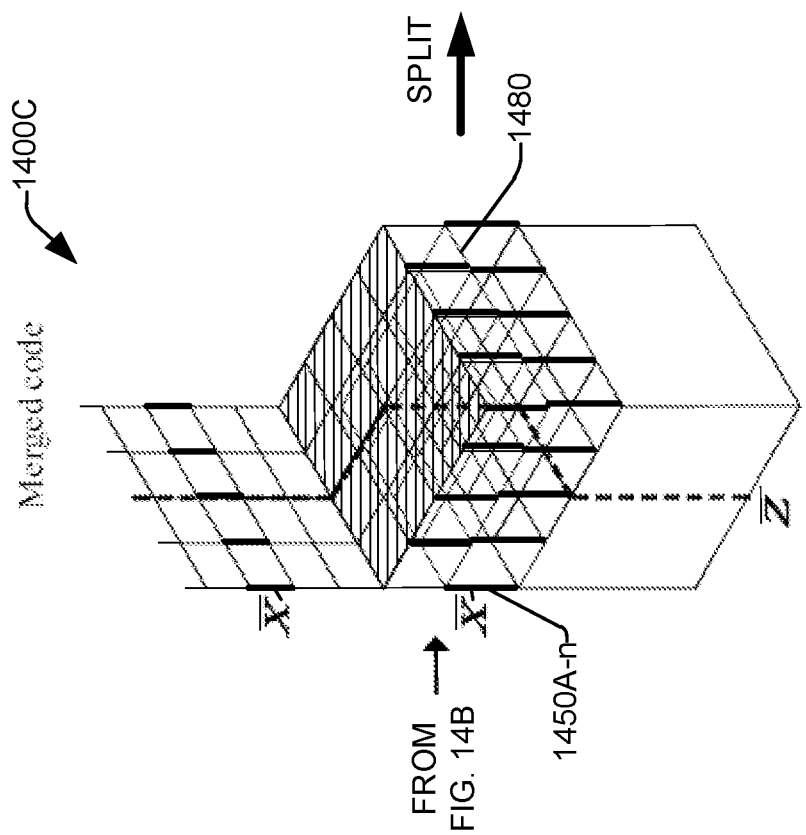

FIG. 14C, schematic 1400C, presents the merged code after d rounds of measurement. Conditioned on the measurement outcome of the joint parity $\overline{X}_\alpha \overline{X}_1$, the merging map can be expressed as follows:

$$\hat{M}_+ = \overline{|+\rangle}_M \overline{\langle ++|}_{1\alpha} + \overline{|-\rangle}_M \overline{\langle --|}_{1\alpha}, \text{ if } \overline{X}_1 \overline{X}_\alpha = +1$$
$$\hat{M}_- = \overline{|+\rangle}_M \overline{\langle +-|}_{1\alpha} + \overline{|-\rangle}_M \overline{\langle -+|}_{1\alpha}, \text{ if } \overline{X}_1 \overline{X}_\alpha = -1,$$

where $\overline{|\psi\rangle}_M$ represents the logical qubit state of the merged code as illustrated in FIG. 14C. The logical state is then transformed by the lattice merging map as:

$$\hat{M}_\pm : (\alpha \overline{|+\rangle}_1 + \beta \overline{|-\rangle}_1) \overline{|0\rangle}_\alpha \rightarrow \alpha \overline{|+\rangle}_M + \beta \overline{|-\rangle}_M$$

The merged state is independent of the parity eigenvalue $\overline{X}_1 \overline{X}_\alpha = \pm 1$ because of the specific choice of state $\overline{|0\rangle}_\alpha$ in the ancilla code block 1320A. As can be seen from the above expression, the initial logical information $\overline{|\psi\rangle}_1$ is transferred to the merged code block as $\overline{|\psi\rangle}_M$. The other two copies in the coupled Kirigami codes are merged with the other two independent ancilla Kirigami code blocks 1320B and 1320C along the corresponding e-boundaries in the other two directions as illustrated in FIGS. 13A-B.

8.4. Lattice Splitting Along e-Boundaries

FIG. 14D, schematic 1400D, presents the lattice splitting protocol, configured to split the merged code again. The unknown stabilizers at the interface are the 3-body Z stabilizers which have random ±1 measurement outcome, which can be inferred by the projective measurement of the ancilla qubits in the Z-basis ($M_Z$). The (−1)-eigenvalue corresponds to the m-loop excitations, which can be corrected with d rounds of measurements. This is achieved by projective measurements of the qubits (white) introduced at the interface in the Z basis. The measurement results will be a random distribution of ±1, and hence the 3-body boundary stabilizers will have the corresponding random ±1 eigenvalues, which corresponds to m-loop excitations at the interface. Next, d rounds of measurement are performed to clean up these excitations, but in this case a single-shot measurement and decoding suffice.

The lattice splitting map can be expressed as:

$$\hat{S} = \overline{|++\rangle}_{1\alpha}\overline{\langle +|}_M + \overline{|--\rangle}_{1\alpha}\overline{\langle -|}_M.$$

After the lattice splitting, the merged logical state is mapped again into a logical state distributed over two codes:

$$\hat{S}: \alpha\overline{|+\rangle}_M + \beta\overline{|-\rangle}_M \to \alpha\overline{|++\rangle} + \beta\overline{|--\rangle} = \frac{1}{\sqrt{2}}\overline{|0\rangle}_1(\alpha\overline{|+\rangle}_\alpha + \beta\overline{|-\rangle}_\alpha) + \frac{1}{\sqrt{2}}\overline{|1\rangle}_1(\alpha\overline{|+\rangle}_\alpha - \beta\overline{|-\rangle}_\alpha),$$

where the logical states are represented in the X-basis.

8.4. Measure Out the Original Code in the Z Basis

The final step is to measure out the logical qubit information of the original Kirigami code in the Z basis. In the illustrated example, copy 1 of the original code is measured out, and the logical state of the new code becomes:

$$\alpha\overline{|+\rangle}_\alpha + (-1)^{M_z}\beta\overline{|-\rangle}_\alpha \equiv (\overline{Z}_\alpha)^{M_z}\overline{|\psi\rangle}_\alpha,$$

where $M_{\tilde{z}}$ is the measurement result of copy 1 in the stack of original Kirigami codes. In the convention here, $M_z$=0 and 1 corresponds to $\overline{|0\rangle}_1$ and $\overline{|1\rangle}_1$, respectively. Therefore, after the measurement, it is possible to just apply a logical-Z correction $\overline{Z}_\alpha$ to the new code conditioned on the measurement value $M_z$=1. Accordingly, the logical information in the first copy $\overline{|\psi\rangle}_1$ is successfully transferred to the ancilla copy as $\overline{|\psi\rangle}_\alpha$. Similarly, the logical information in the other two copies in the coupled Kiriagmi codes is transferred to the other two ancilla code blocks, as illustrated in FIGS. 13A-B. Since the three ancilla copies are the same as the original three copies of the uncoupled Kirigami codes, the new code space $\tilde{\mathcal{H}}$ has been successfully mapped to the original code space $\mathcal{H}$, with a logical CCZ gate being applied.

9. Implementation of Universal Gate Sets

Figure 15:
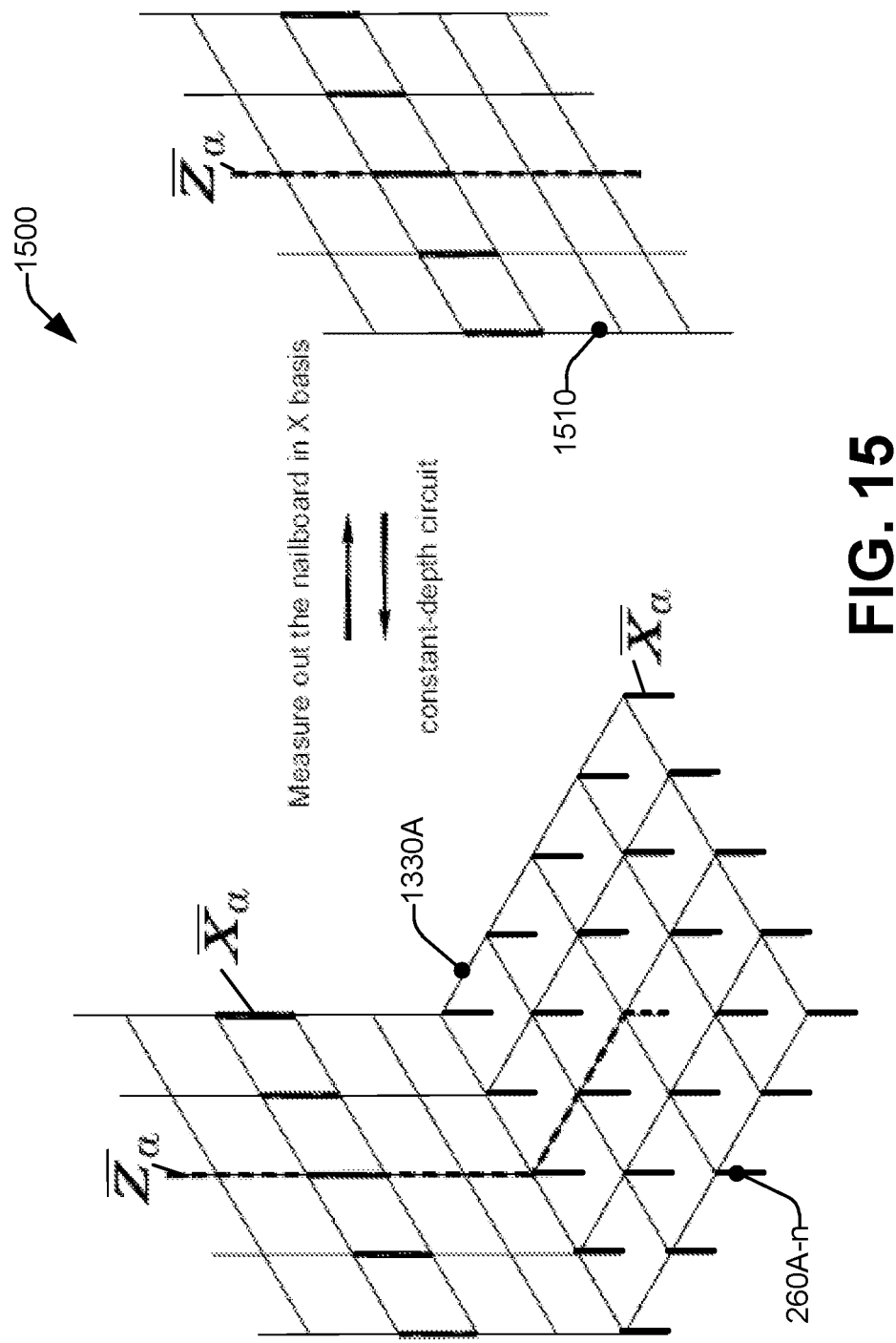
FIG. 15 presents a schematic illustrating transitioning the Kirigami code to a surface code, in accordance with an embodiment.

FIG. 15, schematic 1500, illustrates transitioning the Kirigami code to a surface code, in accordance with an embodiment. Per FIG. 15, after applying the logical CCZ gate, it is also possible to measure out the nailboard patch (cluster state) 1330A in the Z-basis to turn it into the usual surface code 1510 (e.g., surface code 1675). Since the measurement results are randomly being X=±1, the vertex X stabilizers on the lowest row will have random eigenvalues ±1. The measurement results will allow a single-shot decoding with a matching algorithm to match the vertex stabilizers with −1 eigenvalues and hence correct all the errors by applying a Pauli Z string connecting the corresponding vertex stabilizers.

Per the foregoing, it is apparent that it is possible to:

a) implement all the logical Clifford gates via lattice surgeries.

b) in an event of requiring the non-Clifford logical CCZ gates, it is possible to switch the surface code to the Kirigami code (e.g., Kirigami code 1680) via a constant depth circuit followed by d-rounds of measurements to correct the errors.

c) implement a universal logical gate(s) in a 4-layer 2D planar architecture via Kirigami code 1680 and surface code(s) 1675.

FIG. 16, system 1600 illustrates a system configured to implement a quantum error-correcting code including a non-Clifford gate, in accordance with various embodiments presented herein. As shown, system 1600 includes a quantum computing platform 1610 communicatively coupled to a quantum computer 1620. The quantum computer 1620 can further include a control system 1630 and a qubit array 1640. Operation of the qubit array 1640 can be conducted via instructions/algorithms (e.g., quantum error-correcting code 1675, Kirigami code 1680, and suchlike) generated at the quantum computing platform 1610), and implemented via the quantum computer 1620/control system 1630.

As shown, the quantum computing platform 1610 can include an instruction set component 1650, wherein the instruction set device 1650 can include various components, including a quantum error-correcting code component 1652. The quantum error-correcting code component 1652 can be configured to generate/process quantum error-correcting codes, such as a quantum error-correcting code 1675. As previously mentioned, quantum error-correcting code 1675 can be a 2D quantum error-correcting code configured to implement a Clifford gate logic (e.g., on the qubit array 1640). However, implementation of a non-Clifford logical gate on qubit array 1640 is also useful but is difficult to implement with a 2D quantum error-correcting code 1675. In an embodiment, the quantum error-correcting code component 1652 can be configured to receive either of an original or a copy of the quantum error-correcting code 1675 and generate a 3D form from the 2D representation of one or more qubits in the qubit array 1640. As shown, the quantum error-correcting code 1675 can have Clifford gate logic 1677 applied thereto.

In a further embodiment, the instruction set component 1650 can further include a Kirigami code component 1654, which can be utilized to reduce the 3D representation of the qubit array 1640 down to a hollow shape (e.g., a hollow shell, sphere, etc.) as previously described, e.g., via a cut and fold operation.

In another embodiment, the instruction set component 1650 can further include a logical gate component 1656 which can be configured to apply a non-Clifford logical gate 1685 to the 3D representation generated by the Kirigami code component 1654, thereby forming a Kirigami code 1680 having the non-Clifford logical gate 1685 applied thereto. In an embodiment. As previously described, the Kirigami code with non-Clifford gate logic 1680 can be folded to form a 2D representation of the qubit array 1640.

In a further embodiment, the instruction set component 1650 can include a lattice component 1658 which can be utilized to obtain a logical state of the code 1680 with the non-Clifford logical gate 1685 applied thereto (e.g., via an array of ancilla qubits) as previously described. Hence, a first version of quantum error-correcting code 1675 can be created comprising Clifford logical gate 1677, and a second version of the quantum error-correcting code with a non-Clifford gate logic applied 1687. As previously described, a third version of the quantum error-correcting code 1675A can be created from the second version of the quantum error-correcting code with a non-Clifford gate logic applied 1687.

The instruction set component 1650 can further include an implementation component 1670 configured to implement any of the first quantum error-correcting code 1675 (e.g., transformed with the Clifford gate logic 1677), the second quantum error-correcting code 1687 with the non-Clifford gate logic applied, or the third quantum error-correcting code 1675A on the qubit array 1640 via the control system 1630.

As further shown, the quantum computing platform 1610 can further include a computing system 1690 comprising a processor 1692 configured to implement the various components 1652, 1654, 1656, 1658, and/or 1670, and further a memory 1694 (e.g., non-transitory computer-readable medium) configured store instructions/computer program product (e.g., various components 1652, 1654, 1656, 1658, and/or 1670) for execution by the processor 1692.

FIG. 16B further illustrates the quantum computing system 1600, according to at least one embodiment. FIG. 16B schematically illustrates the quantum computing system 1600 which comprises the quantum computing platform 1610, the control system 1630, and a quantum processor 1642. In some embodiments, the quantum computing platform 1610 implements software control programs such as a software-based quantum error correction system 1612 to perform a quantum error correction processes, application of quantum error-correcting code, etc., as well as perform other software-controlled processes such as qubit calibration operations. In addition, in some embodiments, the control system 1630 comprises a multi-channel arbitrary waveform generator 1622, and a quantum bit readout control system 1624. A quantum processor 1642 can comprise a solid-state semiconductor chip having a superconducting qubit array 1640 and a network 1644 of qubit drive lines, coupler flux-bias control lines, and qubit state readout lines, and other circuit QED components that may be needed for a given application or quantum system configuration.

In some embodiments, portions of the control system 1630 and the quantum processor 1642 can be disposed in a dilution refrigeration system which can generate cryogenic temperatures that are sufficient to operate components of the control system 1630 for quantum computing applications. For example, the quantum processor 1842 may need to be cooled down to near-absolute zero, e.g., 10-15 millikelvin (mK), to allow the superconducting qubits to exhibit quantum behaviors. In some embodiments, the dilution refrigeration system can comprise a multi-stage dilution refrigerator where the components of the control system 1630 can be maintained at different cryogenic temperatures, as needed. For example, while the quantum processor 1642 may need to be cooled down to, e.g., 10-15 mK, the circuit components of the control system 1630 may be operated at cryogenic temperatures greater than 10-15 mK (e.g., cryogenic temperatures in a range of 3K-4K), depending on the configuration of the quantum computing system 1600B.

In some embodiments, the superconducting qubit array 1640 comprises a quantum system of superconducting data qubits, superconducting auxiliary qubits, and superconducting qubit couplers. The number of superconducting qubits of the qubit array 1640 can be on the order of tens, hundreds, thousands, or more, etc. The network 1644 of qubit drive lines, coupler flux bias control lines, and qubit state readout lines, etc., are configured to apply microwave control signals to superconducting qubits and coupler circuitry in the superconducting qubit array 1640 to perform various types of gate operations, e.g., single-gate operations, entanglement gate operations (e.g., CPHASE gate operation), perform error correction operations, etc., as well read the quantum states of the superconducting qubits. For example, as noted above, microwave control pulses are applied to the qubit drive lines of respective superconducting qubits to change the quantum state of the superconducting qubits (e.g., change the quantum state of a given qubit between the ground state and excited state, or to a superposition state) when executing quantum information processing algorithms.

Furthermore, as noted above, the state readout lines comprise readout resonators that are coupled to respective superconducting qubits. The state of a given superconducting qubit can be determined through microwave transmission measurements made between readout ports of the readout resonator. The states of the superconducting qubits are read out after executing a quantum algorithm. In some embodiments, a dispersive readout operation is performed in which a change in the resonant frequency of a given readout resonator, which is coupled to a given superconducting qubit, is utilized to readout the state (e.g., ground or excited state) of the given superconducting qubit.

The network 1644 of qubit drive lines, coupler flux bias control lines, and qubit state readout lines, etc., is coupled to the control system 1630 through a suitable hardware input/output (I/O) interface, which couples I/O signals between the control system 1630 and the quantum processor 1642. For example, the hardware I/O interface may comprise various types of hardware and components, such as RF cables, wiring, RF elements, optical fibers, heat exchanges, filters, amplifiers, isolators, etc.

In some embodiments, the multi-channel arbitrary waveform generator (AWG) 1622 and other suitable microwave pulse signal generators are configured to generate the microwave control pulses that are applied to the qubit drive lines, and the coupler drive lines to control the operation of the superconducting qubits and associated qubit coupler circuitry, when performing various gate operations to execute a given certain quantum information processing algorithm. In some embodiments, the multi-channel AWG 1622 comprises a plurality of AWG channels, which control respective superconducting qubits within the superconducting qubit array 1640 of the quantum processor 1642. In some embodiments, each AWG channel comprises a baseband signal generator, a digital-to-analog converter (DAC) stage, a filter stage, a modulation stage, an impedance matching network, and a phase-locked loop system to generate local oscillator (LO) signals (e.g., quadrature LO signals LO_I and LO_Q) for the respective modulation stages of the respective AWG channels.

In some embodiments, the multi-channel AWG 1622 comprises a quadrature AWG system which is configured to process quadrature signals, wherein a quadrature signal comprises an in-phase (I) signal component, and a quadrature-phase (Q) signal component. In each AWG channel the baseband signal generator is configured to receive baseband data as input (e.g., from the quantum computing platform), and generate digital quadrature signals I and Q which represent the input baseband data. In this process, the baseband data that is input to the baseband signal generator for a given AWG channel is separated into two orthogonal digital components including an in-phase (I) baseband component and a quadrature-phase (Q) baseband component. The baseband signal generator for the given AWG channel will generate the requisite digital quadrature baseband IQ signals which are needed to generate an analog waveform (e.g., sinusoidal voltage waveform) with a target center frequency that is configured to operate or otherwise control a given quantum bit that is coupled to the output of the given AWG channel.

The DAC stage for the given AWG channel is configured to convert a digital baseband signal (e.g., a digital IQ signal output from the baseband signal generator) to an analog baseband signal (e.g., analog baseband signals I(t) and Q(t)) having a baseband frequency. The filter stage for the given AWG channel is configured to filter the IQ analog signal components output from the DAC stage to thereby generate filtered analog IQ signals. The modulation stage for the given AWG channel is configured to perform analog IQ signal modulation (e.g., single-sideband (SSB) modulation) by mixing the filtered analog signals I(t) and Q(t), which are output from the filter stage, with quadrature LO signals (e.g., an in-phase LO signal (LO_I) and a quadrature-phase LO signal (LO_Q)) to generate and output an analog RF signal (e.g., a single-sideband modulated RF output signal).

In some embodiments, the quantum bit readout control system 1624 comprises a microwave pulse signal generator that is configured to apply a microwave tone to a given readout resonator line of a given superconducting qubit to perform a readout operation to readout the state of the given superconducting qubit, as well as circuitry that is configured to process the readout signal generated by the readout resonator line to determine the state of the given superconducting qubit, using techniques known to those of ordinary skill in the art.

The quantum computing platform 1610 comprises a software and hardware platform which comprises various software layers that are configured to perform various functions, including, but not limited to, generating and implementing various quantum applications (e.g., first quantum error-correcting code 1675, second quantum error-correcting code 1687, third quantum error-correcting code 1675A, Kirigami code 1680, and suchlike) using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1610 comprises a hardware architecture of processors, memory, etc., which is configured to control the execution of quantum applications, and interface with the control system 1630 to (i) generate digital control signals that are converted to analog microwave control signals by the control system 1630, to control operations of the quantum processor 1642 when executing a given quantum application, and (ii) to obtain and process digital signals received from the control system 1630, which represent the processing results generated by the quantum processor 1642 when executing various gate operations for a given quantum application.

In some exemplary embodiments, the quantum computing platform 1610 of the quantum computing system 1600 may be implemented using any suitable computing system architecture which is configured to implement methods to support quantum computing operations by executing computer readable program instructions that are embodied on a computer program product which includes a computer readable storage medium (or media) having such computer readable program instructions thereon for causing a processor to perform control methods as discussed herein.

The quantum computing platform 1610 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1610 comprises a hardware architecture of processors, memory, etc., which is configured to control the execution of quantum applications, and interface with the control system 1630 to (i) generate digital control signals that are converted to analog microwave control signals by the control system 1630, to control operations of the quantum processor 1642 when executing a given quantum application, and (ii) to obtain and process digital signals received from the control system 1630, which represent the processing results generated by the quantum processor 1642 when executing various gate operations for a given quantum application. In some exemplary embodiments, the quantum computing platform 1610 of the quantum computing system 1600B may be implemented using any suitable computing system architecture which is configured to implement methods to support quantum computing operations by executing computer readable program instructions that are embodied on a computer program product which includes a computer readable storage medium (or media) having such computer readable program instructions thereon for causing a processor to perform control methods as discussed herein.

Figure 17:
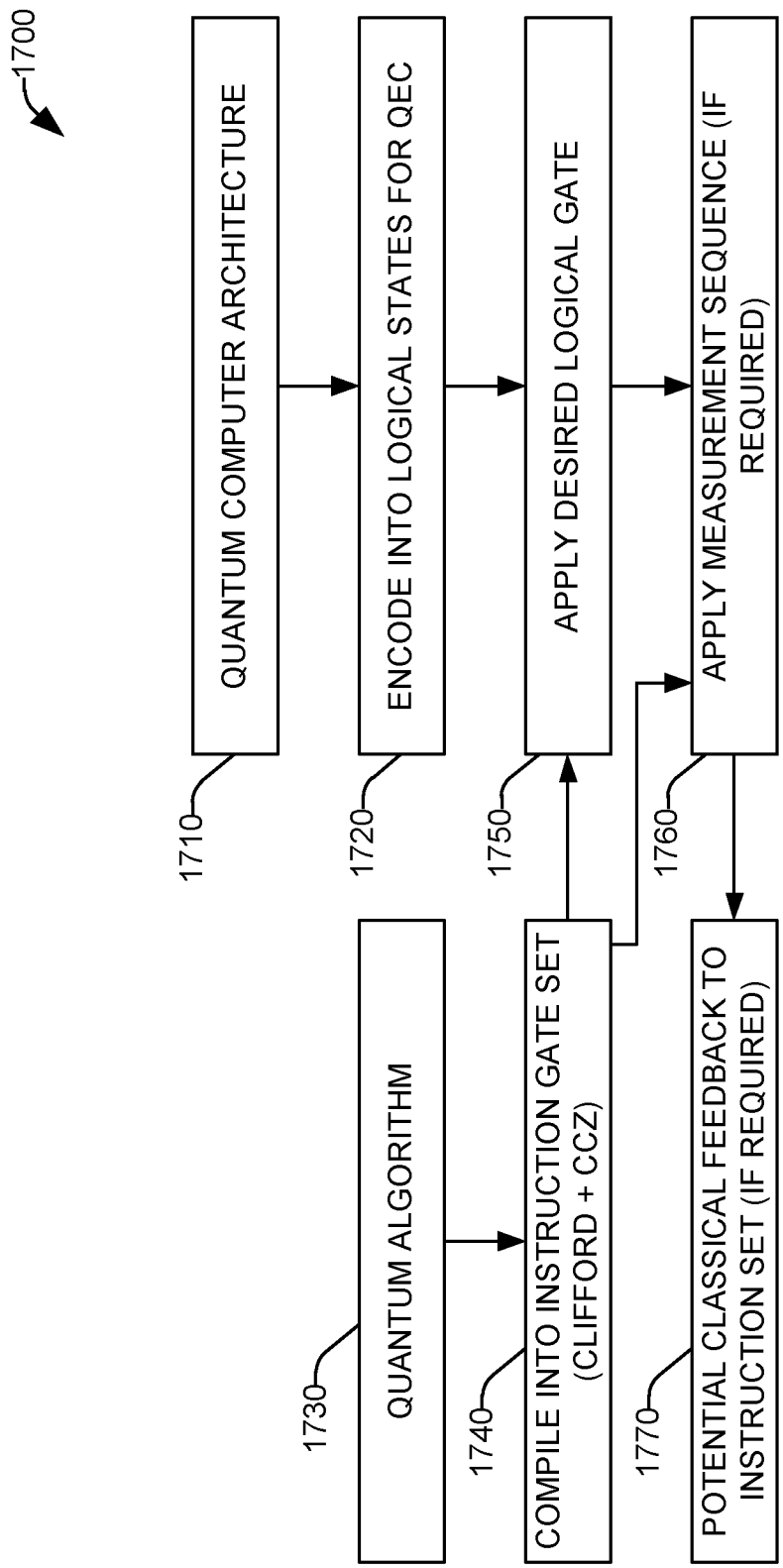
FIG. 17 presents a schematic of an example system and system flow to apply a logical gate to a quantum error-correcting code, in accordance with one or more embodiments.

FIG. 17, schematic 1700, presents an example system to apply a logical gate to a quantum error-correcting code, in accordance with one or more embodiments presented herein. FIG. 17 essentially comprises two procedures/flows, the right hand side pertains to the physical architecture and the left hand side, algorithmic side, pertains to operations involving a quantum error-correcting code At 1710, a quantum algorithm (e.g., quantum algorithm 1672) is to be implemented on a quantum computer architecture (e.g., quantum computing platform 1610 in conjunction with quantum computer 1620) (e.g., a full quantum error corrected machine).

At 1720, the quantum computer can be encoded with a quantum error correcting (QEC) code (e.g., QEC 1675)

At 1730, an algorithm (e.g., quantum error-correcting code 1675). is generated comprising instructions to be sent to/applied on the quantum computer.

At 1740, one or more algorithms (aka native instructions) can be compiled into a universal gate set (e.g., an instruction set). Algorithms can operate based on a set of logical gates, e.g., a set of Clifford Gates (e.g., Clifford gate 1677), one or more non-Clifford gate sets (e.g., non-Clifford gate 1685, a CCZ gate, a T-type gate, and suchlike), etc. The instruction set including the logical gates can be sent to/applied to the quantum computer (e.g., quantum computer 1620), with a requirement to operate (e.g., on qubit array 1640) with the logical gates defined in the logic set.

At 1750, the quantum algorithm, comprising the respective logical gates, can be applied to/run on the QEC code controlling operation of the quantum error corrected architecture.

At 1760, a logical measurement sequence can be applied (e.g., on the qubit array 1640), as required.

At 1770, feedback can be generated and, if required, the instruction set (e.g., generated at 1740) can be modified/updated accordingly.

Figure 18:
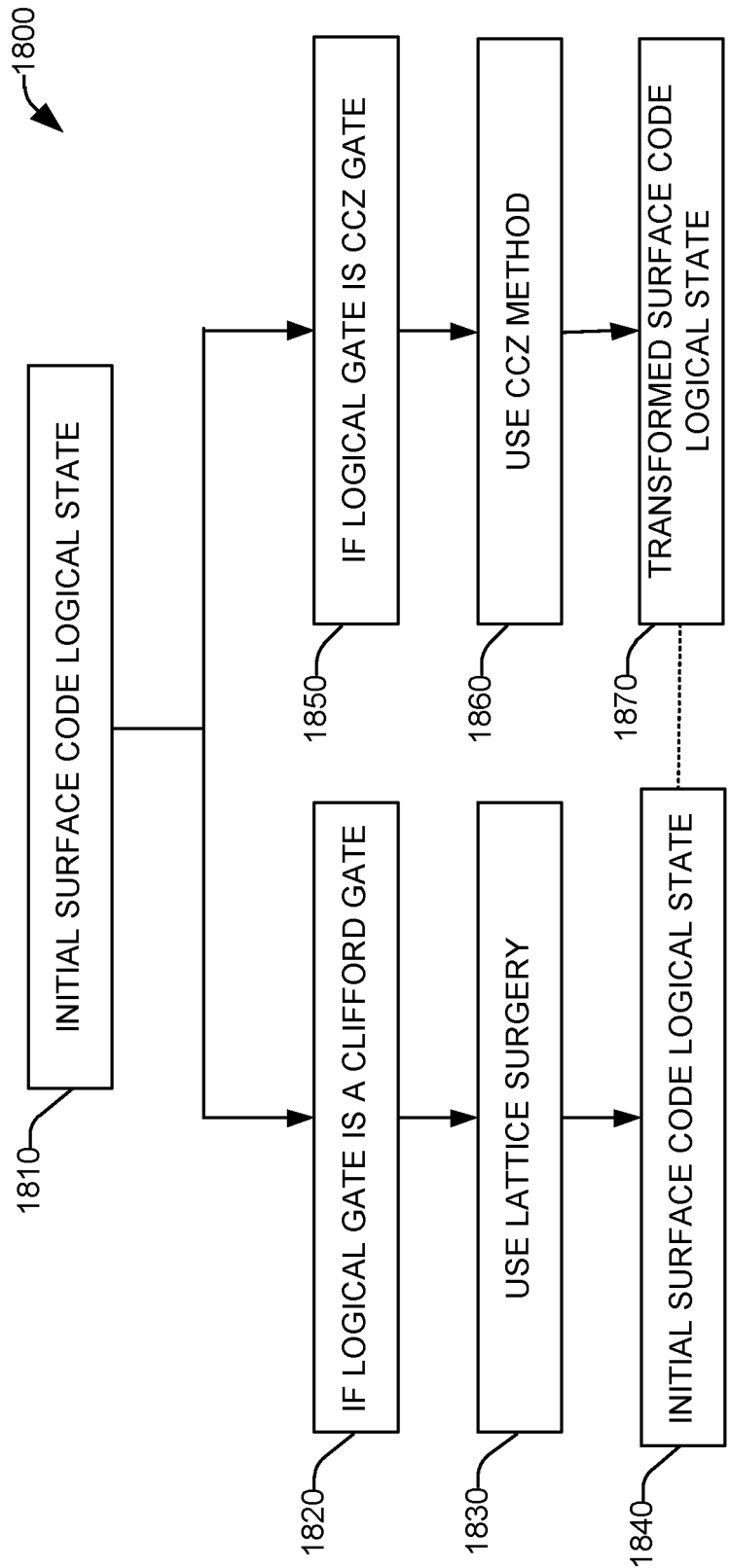
FIG. 18 presents an example system and system flow to apply a logical gate to a quantum error-correcting code, in accordance with one or more embodiments presented herein.

FIG. 18, schematic 1800, presents an example system to apply a logical gate to a quantum error-correcting code, in accordance with one or more embodiments presented herein. FIG. 18 essentially comprises two procedures/flows, the left hand side pertains to a first version of a quantum error-correcting code comprising a logical gate such as a Clifford gate, and the right hand side pertains to a second version of the quantum error-correcting code comprising a logical gate such as a CCZ gate.

At 1810, a surface code (e.g., a 2D surface code 1675) having an initial logical state is obtained. In an embodiment, the surface code can be an error correction code to be applied to qubits (e.g., qubits in qubit array 1640) in a quantum computer system (e.g., quantum computer 1620). A first logical gate such as a Clifford gate (e.g., a Clifford gate 1677) can be applied to the surface code (per steps 1820-1840 below), or a second logical gate, .e.g., a non-Clifford gate (e.g., a CCZ gate 1685, a T-type gate, and suchlike) can be applied to the surface code (per steps 1850-1870). In a further embodiment, the quantum error-correcting code can be in a 2D form.

At 1820, a Clifford gate (e.g., Clifford gate 1677) can be selected to be applied to the quantum error-correcting code.

At 1830, any suitable approach can be utilized to apply the Clifford gate logic to the quantum error-correcting code. For example, a lattice surgery technique can be utilized to apply the Clifford gate logic to the quantum error-correcting code.

At 1840, the surface code can effectively still be in an original logical state having a 2D form, or further, the surface code can be in a transformed state resulting from application of the Clifford gate logic to the quantum error-correcting code.

At 1850, a non-Clifford gate can be applied to the quantum error-correcting code, wherein the quantum error-correcting code currently retains the initial logical state. As previously mentioned, the non-Clifford gate can be a CCZ gate or other logical gate which cannot be easily incorporated into a quantum error-correcting code having a 2D form. The non-Clifford gate can be applied in response to a requirement of an instruction set.

At 1860, the non-Clifford gate can be applied with a constant depth circuit.

At 1870, as a function of implementation of steps 1850-1860, a transformed surface code (e.g., Kirigami code 1680) can be generated and having a logical state based on application of the non-Clifford logical gate.

Hence, per 1840 and 1850, a first version of a surface code (e.g., quantum error-correcting code 1675 with Clifford gate 1677 applied) can be in existence as a function of applying the Clifford logical gate to the initial surface code. Further, a second version (e.g., quantum error-correcting code 1687 with non-Clifford gate 1685 applied) of a surface code can be in existence as a function of applying the non-Clifford logical gate to the initial quantum error-correcting code. In an embodiment, the second version of the surface code can be returned to the initial quantum error-correcting code.

10. Example Applications and Use

Figure 19:
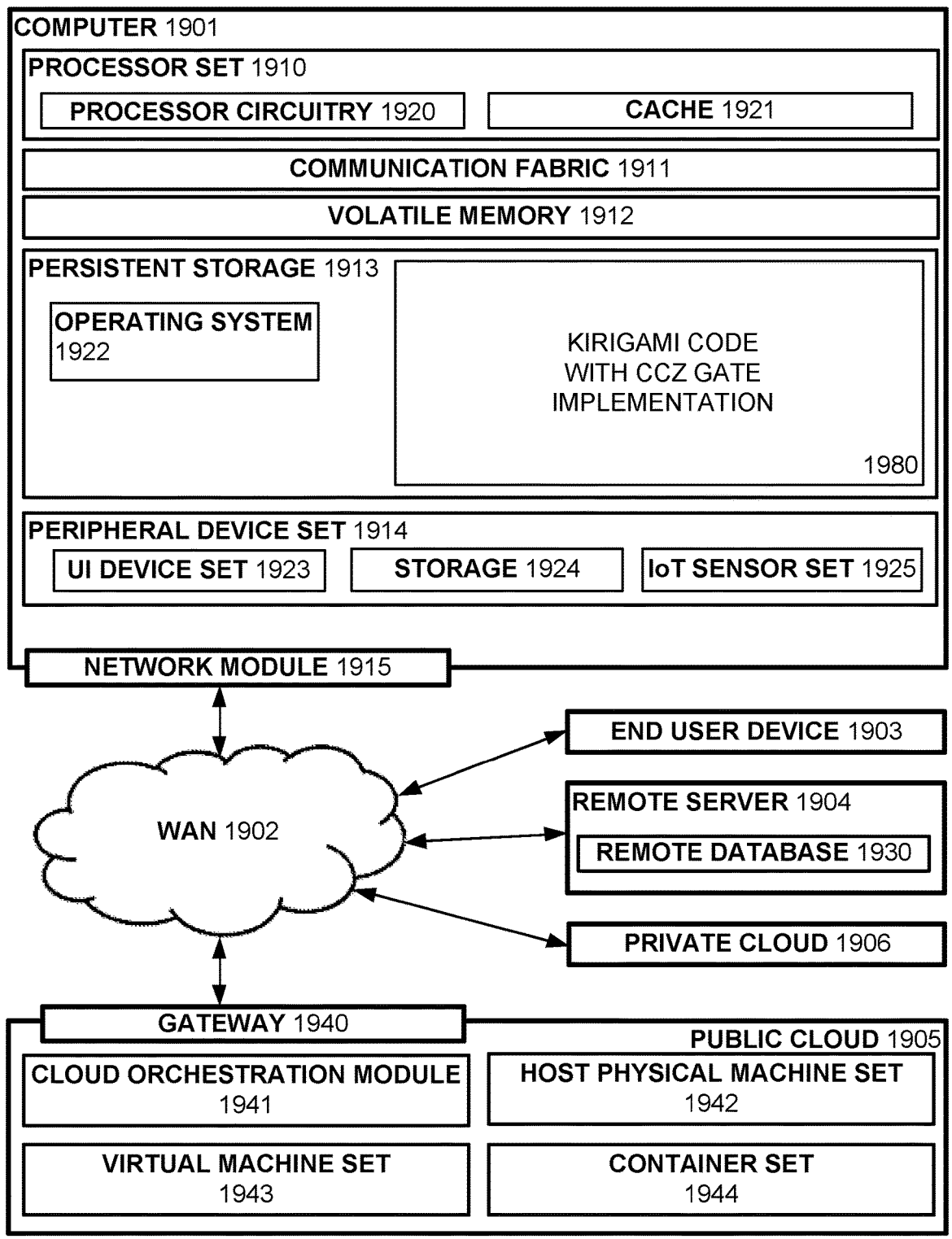
FIG. 19 depicts an example schematic block diagram of a computing environment with which the disclosed subject matter can interact/be implemented at least in part, in accordance with various aspects and implementations of the subject disclosure.

FIG. 19 and the following discussion are intended to provide a brief, general description of a suitable computing environment 1900 in which one or more embodiments described herein at FIGS. 1-18 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1900 contains an example of an environment for the execution of at least some of the computer code involved in performing the inventive methods, such as incorporating a non-Clifford logical gate into a 2D quantum error-correcting code by application of Kirigami code having CCZ logical gate implementation 1980. In addition to block 1980, computing environment 1900 includes, for example, computer 1901, wide area network (WAN) 1902, end user device (EUD) 1903, remote server 1904, public cloud 1905, and private cloud 1906. In this embodiment, computer 1901 includes processor set 1910 (including processing circuitry 1920 and cache 1921), communication fabric 1911, volatile memory 1912, persistent storage 1913 (including operating system 1922 and block 1980, as identified above), peripheral device set 1914 (including user interface (UI), device set 1923, storage 1924, and Internet of Things (IoT) sensor set 1925), and network module 1915. Remote server 1904 includes remote database 1930. Public cloud 1905 includes gateway 1940, cloud orchestration module 1941, host physical machine set 1942, virtual machine set 1943, and container set 1944.

COMPUTER 1901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1930. As is well understood in the art of computer technology, and depending upon the technology, performance of a computer-implemented method can be distributed among multiple computers and/or between multiple locations. On the other hand, in this presentation of computing environment 1900, detailed discussion is focused on a single computer, specifically computer 1901, to keep the presentation as simple as possible. Computer 1901 can be located in a cloud, even though it is not shown in a cloud in FIG. 19. On the other hand, computer 1901 is not required to be in a cloud except to any extent as can be affirmatively indicated.

PROCESSOR SET 1910 includes one, or more, computer processors of any type now known or to be developed in the future. Processing circuitry 1920 can be distributed over multiple packages, for example, multiple, coordinated integrated circuit chips. Processing circuitry 1920 can implement multiple processor threads and/or multiple processor cores. Cache 1921 is memory that is located in the processor chip package(s) and is typically used for data or code that should be available for rapid access by the threads or cores running on processor set 1910. Cache memories are typically organized into multiple levels depending upon relative proximity to the processing circuitry. Alternatively, some, or all, of the cache for the processor set can be located "off chip." In some computing environments, processor set 1910 can be designed for working with qubits and performing quantum computing.

Computer readable program instructions are typically loaded onto computer 1901 to cause a series of operational steps to be performed by processor set 1910 of computer 1901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1921 and the other storage media discussed below. The program instructions, and associated data, are accessed by processor set 1910 to control and direct performance of the inventive methods. In computing environment 1900, at least some of the instructions for performing the inventive methods can be stored in block 1980 in persistent storage 1913.

COMMUNICATION FABRIC 1911 is the signal conduction path that allows the various components of computer 1901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1912 is any type of volatile memory now known or to be developed in the future. Examples include dynamic type random access memory (RAM) or static type RAM. Typically, the volatile memory is characterized by random access, but this is not required unless affirmatively indicated. In computer 1901, the volatile memory 1912 is located in a single package and is internal to computer 1901, but, alternatively or additionally, the volatile memory can be distributed over multiple packages and/or located externally with respect to computer 1901.

PERSISTENT STORAGE 1913 is any form of non-volatile storage for computers that is now known or to be developed in the future. The non-volatility of this storage means that the stored data is maintained regardless of whether power is being supplied to computer 1901 and/or directly to persistent storage 1913. Persistent storage 1913 can be a read only memory (ROM), but typically at least a portion of the persistent storage allows writing of data, deletion of data and re-writing of data. Some familiar forms of persistent storage include magnetic disks and solid-state storage devices. Operating system 1922 can take several forms, such as various known proprietary operating systems or open-source Portable Operating System Interface type operating systems that employ a kernel. The code included in block 1980 typically includes at least some of the computer code involved in performing the inventive methods.

PERIPHERAL DEVICE SET 1914 includes the set of peripheral devices of computer 1901. Data communication connections between the peripheral devices and the other components of computer 1901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1923 can include components such as a display screen, speaker, microphone, wearable devices (such as goggles and smart watches), keyboard, mouse, printer, touchpad, game controllers, and haptic devices. Storage 1924 is external storage, such as an external hard drive, or insertable storage, such as an SD card. Storage 1924 can be persistent and/or volatile. In some embodiments, storage 1924 can take the form of a quantum computing storage device for storing data in the form of qubits. In embodiments where computer 1901 is required to have a large amount of storage (for example, where computer 1901 locally stores and manages a large database) then this storage can be provided by peripheral storage devices designed for storing large amounts of data, such as a storage area network (SAN) that is shared by multiple, geographically distributed computers. IoT sensor set 1925 is made up of sensors that can be used in Internet of Things applications. For example, one sensor can be a thermometer and another sensor can be a motion detector.

NETWORK MODULE 1915 is the collection of computer software, hardware, and firmware that allows computer 1901 to communicate with other computers through WAN 1902. Network module 1915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1915 are performed on the same physical hardware device. In other embodiments (for example, embodiments that utilize software-defined networking (SDN)), the control functions and the forwarding functions of network module 1915 are performed on physically separate devices, such that the control functions manage several different network hardware devices. Computer readable program instructions for performing the inventive methods can typically be downloaded to computer 1901 from an external computer or external storage device through a network adapter card or network interface included in network module 1915.

WAN 1902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1903 is any computer system that is used and controlled by an end user (for example, a customer of an enterprise that operates computer 1901) and can take any of the forms discussed above in connection with computer 1901. EUD 1903 typically receives helpful and useful data from the operations of computer 1901. For example, in a hypothetical case where computer 1901 is designed to provide a recommendation to an end user, this recommendation would typically be communicated from network module 1915 of computer 1901 through WAN 1902 to EUD 1903. In this way, EUD 1903 can display, or otherwise present, the recommendation to an end user. In some embodiments, EUD 1903 can be a client device, such as thin client, heavy client, mainframe computer and/or desktop computer.

REMOTE SERVER 1904 is any computer system that serves at least some data and/or functionality to computer 1901. Remote server 1904 can be controlled and used by the same entity that operates computer 1901. Remote server 1904 represents the machine(s) that collect and store helpful and useful data for use by other computers, such as computer 1901. For example, in a hypothetical case where computer 1901 is designed and programmed to provide a recommendation based on historical data, then this historical data can be provided to computer 1901 from remote database 1930 of remote server 1904.

PUBLIC CLOUD 1905 is any computer system available for use by multiple entities that provides on-demand availability of computer system resources and/or other computer capabilities, especially data storage (cloud storage) and computing power, without direct active management by the scale. The direct and active management of the computing resources of public cloud 1905 is performed by the computer hardware and/or software of cloud orchestration module 1941. The computing resources provided by public cloud 1905 are typically implemented by virtual computing environments that run on various computers making up the computers of host physical machine set 1942, which is the universe of physical computers in and/or available to public cloud 1905. The virtual computing environments (VCEs) typically take the form of virtual machines from virtual machine set 1943 and/or containers from container set 1944. It is understood that these VCEs can be stored as images and can be transferred among and between the various physical machine hosts, either as images or after instantiation of the VCE. Cloud orchestration module 1941 manages the transfer and storage of images, deploys new instantiations of VCEs and manages active instantiations of VCE deployments. Gateway 1940 is the collection of computer software, hardware and firmware allowing public cloud 1905 to communicate through WAN 1902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1906 is similar to public cloud 1905, except that the computing resources are only available for use by a single enterprise. While private cloud 1906 is depicted as being in communication with WAN 1902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1905 and private cloud 1906 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or quantum error-correcting code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

Various non-limiting aspects of various embodiments described herein are presented in the following clauses:

Clause 1: A quantum computing system, comprising at least one processor and a memory coupled to the at least one processor and having instructions stored thereon, wherein, in response to the at least one processor, the instructions facilitate performance of operations, comprising: generating a two-dimensional (2D) quantum error-correcting (QEC) code, wherein the 2D QEC includes a non-Clifford logical gate configuration and applying the 2D QEC on a qubit lattice. Such an approach enables a non-Clifford logical gate to be incorporated into a 2D QEC, thereby expanding application and versatility of 2D QEC's on a quantum computing system.

Clause 2: The quantum computing system of any preceding clause, wherein the operations can further comprise receiving a 2D QEC and a 3D surface code, wherein the 2D QEC and 3D surface code represent respective qubits in the qubit lattice. In an embodiment, the 3D surface code can have the non-Clifford logical gate applied thereto, where the 3D surface code is a representation of the 2D QEC.

Clause 3: The quantum computing system of any preceding clause, wherein the operations can further comprise applying a Kirigami cut process to the 3D surface code to remove an inner portion of the 3D lattice, thereby reducing the 3D surface code to a Kirigami 3D code comprising a thin-walled topological arrangement. The Kirigami cut process enables a 3D representation to be turned into a hollow form, such that the hollow form, comprising the thin-walls, can be flattened/compacted from a 3D form to a 2D form.

Clause 4: The quantum computing system of any preceding clause, wherein the operations can further comprise applying a non-Clifford logical gate to the Kirigami 3D code to modify the Kirigami 3D code, wherein the modified Kirigami 3D code includes a non-Clifford logical gate configuration. Such an approach enables the non-Clifford logical gate to be injected into the 3D code in readiness for flattening/compactifying to the 2D format.

Clause 5: The quantum computing system of any preceding clause, wherein the operations can further comprise applying a Kirigami fold process to the modified Kirigami 3D code to reduce the Kirigami 3D code to the 2D QEC, wherein the 2D QEC includes the non-Clifford logical gate configuration. As previously mentioned, the Kirigami folding process enables the 3D thin-shelled form to be collapsed to the 2D format and further undergo folding of surfaces to enable a reduction in the complexity of the flattened 3D/2D code to a 2D code comprising fewer surfaces.

Clause 6: The quantum computing system of any preceding clause, wherein the operations can further comprise implementing a lattice surgery protocol to the Kirigami 3D code to map the Kirigami 3D code comprising the non-Clifford logical gate configuration. The lattice surgery protocol can further comprise: introducing an ancilla Kirigami code block to the Kirigami 3D code comprising the non-Clifford logical gate configuration, and mapping the Kirigami 3D code comprising the non-Clifford logical gate configuration to the ancilla Kirigami code block. Application of the ancilla Kirigami code block enables the information in the 2D code generated from the Kirigami 3D code to be captured/transferred.

Clause 7: The quantum computing system of any preceding clause, wherein the operations further comprise applying the 2D QEC having the non-Clifford logical gate configuration to the qubit lattice. Per the embodiments presented herein, the 2D code can be applied to the qubit array/lattice furthering the application of 2D codes and the respective logical gates that the 2D codes can comprise.

Clause 8: The quantum computing system of any preceding clause, wherein the 2D QEC and 3D surface code are Abelian topological codes.

Clause 9: The quantum computing system of any preceding clause, wherein the non-Clifford logical gate is a control-control-Z (CCZ) logical gate or a T-type logical gate. As previously mentioned, applying a non-Clifford logical gate to a 2D QEC can be problematic to the point of being impossible.

Clause 10: A computer-implemented method, comprising generating, by a device comprising a processor, a two-dimensional (2D) quantum error-correcting code (QEC), wherein the 2D QEC includes a non-Clifford logical gate configuration for application on a qubit lattice, wherein the device is located on a quantum computer system, and applying, to a quantum processor by a control system instructed by the processor, the 2D QEC.

Clause 11: The computer-implemented method of any preceding clause, further comprising receiving, by the device, a 2D QEC and a 3D surface code, wherein the 2D QEC and 3D surface code represent respective qubits the qubit lattice.

Clause 12: The computer-implemented method of any preceding clause, further comprising: applying, by the device, a Kirigami cut process to the 3D surface code to remove an inner portion of the 3D lattice, thereby reducing the 3D surface code to a Kirigami 3D code comprising a thin-walled topological arrangement; further applying, by the device, a non-Clifford logical gate to the Kirigami 3D code to modify the Kirigami 3D code, wherein the modified Kirigami 3D code includes a non-Clifford logical gate configuration; and further applying, by the device, a Kirigami fold process to the modified Kirigami 3D code to reduce the Kirigami 3D code to a 2D QEC, wherein the 2D QEC includes the non-Clifford logical gate configuration.

Clause 13: The computer-implemented method of any preceding clause, further comprising: implementing, by the device, a lattice surgery protocol to the Kirigami code to map the Kirigami 3D code comprising the non-Clifford logical gate configuration, the lattice surgery protocol further comprises: applying, by the device, an ancilla Kirigami code block to the modified Kirigami 3D code comprising the non-Clifford logical gate configuration; and mapping, by the device, the modified Kirigami 3D code comprising the non-Clifford logical gate configuration to the ancilla Kirigami code block.

Clause 14: The computer-implemented method of any preceding clause, wherein the non-Clifford logical gate is a control-control-Z (CCZ) logical gate.

Clause 15: A computer program product stored on a non-transitory computer-readable medium and comprising machine-executable instructions, wherein, in response to being executed, the machine-executable instructions cause a machine to perform operations, comprising: generating, by a device comprising a processor, a two-dimensional (2D) quantum error-correcting code (QEC), wherein the 2D QEC includes a non-Clifford logical gate configuration for application on a qubit lattice, wherein the device is located on a quantum computer system; and applying, to a quantum processor by a control system instructed by the processor, the 2D QEC.

Clause 16: The computer program product of any preceding clause, wherein the operations further comprise: receiving, by the device, a 2D QEC; and a 3D surface code wherein the 2D QEC and 3D surface code represent respective qubits in the qubit lattice.

Clause 17: The computer program product of any preceding clause, wherein the operations further comprise: applying a Kirigami cut process to the 3D surface code to remove an inner portion of a 3D lattice included in the 3D surface code, thereby reducing the 3D surface code to a Kirigami 3D code comprising a thin-walled topological arrangement; applying a non-Clifford logical gate to the Kirigami 3D code to modify the Kirigami 3D code, wherein the modified Kirigami 3D code includes a non-Clifford logical gate configuration; and applying a Kirigami fold process to the modified Kirigami 3D code to reduce the modified Kirigami 3D code to a 2D QEC, wherein the 2D QEC includes the non-Clifford logical gate configuration.

Clause 18: The computer program product of any preceding clause, wherein the operations further comprise: implementing a lattice surgery protocol to the modified Kirigami 3D code to map the modified Kirigami 3D code comprising the non-Clifford logical gate configuration. The lattice surgery protocol further comprises applying an ancilla Kirigami code block to the modified Kirigami 3D code comprising the non-Clifford logical gate configuration; and mapping the modified Kirigami 3D code comprising the non-Clifford logical gate configuration to the ancilla Kirigami code block.

Clause 19: The computer program product of any preceding clause, wherein the non-Clifford logical gate is a control-control-Z (CCZ) logical gate.

What is claimed is:

1. A quantum computing system, comprising:
   at least one processor; and
   a memory coupled to the at least one processor and having instructions stored thereon, wherein, in response to the at least one processor executing the instructions, the instructions facilitate performance of operations, comprising:
   receiving a first two-dimensional (2D) quantum error-correcting (QEC) code, wherein the first 2D QEC code represents respective qubits in a qubit lattice;
   transforming the first 2D QEC code to generate a first three-dimensional (3D) surface code;
   applying a digital representation of a non-Clifford logical gate to the first 3D surface code, wherein application of the non-Clifford logical gate digital representation to the first 3D surface code generates a second 3D surface code, wherein the second 3D surface code comprises the first 3D surface code modified to include the non-Clifford logical gate digital representation;
   compacting the second 3D surface code to form a second 2D QEC code, wherein the 2D QEC code includes the non-Clifford logical gate digital representation; and
   applying the second 2D QEC code to a qubit in the qubit lattice, wherein the applying of the second 2D QEC code to the qubit removes a deleterious effect of an operational environment on the coherency of the qubit.

2. The quantum computing system of claim 1, wherein the first 2D QEC code, the second 2D QEC code, the first 3D surface code, and the second 3D surface code represent respective qubits in the qubit lattice.

3. The quantum computing system of claim 2, wherein the operations further comprise applying a Kirigami cut process to the first 3D surface code to remove an inner portion of the 3D lattice, thereby reducing the first 3D surface code to form the second 3D surface code, wherein the second 3D surface code comprises a Kirigami 3D code comprising a thin-walled topological arrangement.

4. The quantum computing system of claim 3, wherein the operations further comprise applying the non-Clifford logical gate digital representation to the Kirigami 3D code to modify the Kirigami 3D code, wherein the modified Kirigami 3D code includes the non-Clifford logical gate configuration digital representation.

5. The quantum computing system of claim 4, wherein the operations further comprise applying a Kirigami fold process to the modified Kirigami 3D code to compact the Kirigami 3D code to form the second 2D QEC code, wherein the second 2D QEC code includes the non-Clifford logical gate configuration digital representation.

6. The quantum computing system of claim 5, wherein the operations further comprise implementing a lattice surgery protocol to the Kirigami 3D code to map the Kirigami 3D code comprising the non-Clifford logical gate digital representation, the lattice surgery protocol further comprises:
   introducing an ancilla Kirigami code block to the Kirigami 3D code comprising the non-Clifford logical gate digital representation; and
   mapping the Kirigami 3D code comprising the non-Clifford logical gate digital representation to the ancilla Kirigami code block.

7. The quantum computing system of claim 2, wherein the first 2D QEC code, the second 2D QEC code, the first 3D surface code and the second 3D surface code are Abelian topological codes.

8. The quantum computing system of claim 1, wherein the non-Clifford logical gate is a control-control-Z (CCZ) logical gate.

9. The quantum computing system of claim 1, wherein the non-Clifford logical gate is a T-type logical gate.

10. A computer-implemented method for improving computational accuracy of a quantum computing system, comprising:
    receiving, by a device comprising at least one processor, a first two-dimensional (2D) quantum error-correcting (QEC) code (QEC), wherein the first 2D QEC code represents respective qubits in a qubit lattice, wherein the device is located in a quantum computer system;
    transforming, by the device, the first 2D QEC code to generate a first three-dimensional (3D) surface code;
    applying, by the device, a digital representation of a non-Clifford logical gate to the first 3D surface code, wherein application of the non-Clifford logical gate to the first 3D surface code generates a second 3D surface code, wherein the second 3D surface code comprises the first 3D surface code modified to include the non-Clifford logical gate digital representation;
    compacting, by the device, the second 3D surface code to form a second 2D QEC code, wherein the 2D QEC code includes the non-Clifford logical gate digital representation; and
    applying, by the device, the second 2D QEC code to a qubit in the qubit lattice, wherein the applying of the second 2D QEC code to the qubit removes a deleterious effect of the operational environment on the coherency of the qubit.

11. The computer-implemented method of claim 10, further comprising:
    wherein the first 2D QEC code, the second 2D QEC code, the first 3D surface code, and the second 3D surface code represent respective qubits the qubit lattice.

12. The computer-implemented method of claim 11, further comprising:
    applying, by the device, a Kirigami cut process to the first 3D surface code to remove an inner portion of the 3D lattice, thereby reducing the first 3D surface code to create a Kirigami 3D code comprising a thin-walled topological arrangement;
    applying, by the device, the non-Clifford logical gate digital representation to the Kirigami 3D code to modify the Kirigami 3D code to form the second 3D surface code, wherein the second 3D surface code comprises the modified Kirigami 3D code and includes the non-Clifford logical gate digital representation; and applying, by the device, a Kirigami fold process to the second 3D surface code to reduce the Kirigami 3D code to form the second 2D QEC code, wherein the second 2D QEC code includes the non-Clifford logical gate digital representation.

13. The computer-implemented method of claim 12, further comprising:
   implementing, by the device, a lattice surgery protocol to the Kirigami 3D code to map the second 3D surface code comprising the non-Clifford logical gate digital representation, the lattice surgery protocol further comprises:
      applying, by the device, an ancilla Kirigami code block to the second 3D surface code comprising the non-Clifford logical gate digital representation; and
      mapping, by the device, the second 3D surface code comprising the non-Clifford logical gate digital representation to the ancilla Kirigami code block.

14. The computer-implemented method of claim 10, wherein the non-Clifford logical gate is a control-control-Z (CCZ) logical gate.

15. The computer-implemented method of claim 10, wherein the non-Clifford logical gate is one of a control-control-Z (CCZ) logical gate or a T-type logical gate.

16. A computer program product stored on a non-transitory computer-readable medium and comprising machine-executable instructions, wherein, in response to being executed, the machine-executable instructions cause a quantum computer system to perform operations, comprising:
   receiving a first two-dimensional (2D) quantum error-correcting (QEC) code (QEC), wherein the first 2D QEC code represents respective qubits in a qubit lattice;
   transforming the first 2D QEC code to generate a first three-dimensional (3D) surface code;
   applying a digital representation of a non-Clifford logical gate to the first 3D surface code, wherein application of the non-Clifford logical gate digital representation to the first 3D surface code generates a second 3D surface code, wherein the second 3D surface code comprises the first 3D surface code modified to include the non-Clifford logical gate digital representation;
   compacting, by the device, the second 3D surface code to form a second 2D QEC code, wherein the 2D QEC code includes the non-Clifford logical gate digital representation; and
   applying the second 2D QEC code to a qubit in the qubit lattice, wherein the applying of the second 2D QEC code to the qubit removes a deleterious effect of the operational environment on the coherency of the qubit.

17. The computer program product according to claim 16, wherein the first 2D QEC code, the second 2D QEC code, the first 3D surface code, and the second 3D surface code represent respective qubits in the qubit lattice.

18. The computer program product according to claim 16, wherein the operations further comprise:
   applying a Kirigami cut process to the first 3D surface code to remove an inner portion of a 3D lattice included in the first 3D surface code, thereby reducing the first 3D surface code to a Kirigami 3D code comprising a thin-walled topological arrangement;
   applying the non-Clifford logical gate digital representation to the Kirigami 3D code to modify the Kirigami 3D code to create the second 3D surface code, wherein the modified Kirigami 3D code includes the non-Clifford logical gate digital representation; and
   applying a Kirigami fold process to the second 3D surface code to reduce the modified Kirigami 3D code to form the second 2D QEC code, wherein the second 2D QEC code includes the non-Clifford logical gate digital representation.

19. The computer program product according to claim 18, wherein the operations further comprise:
   implementing a lattice surgery protocol to the modified Kirigami 3D code to map the modified Kirigami 3D code comprising the non-Clifford logical gate digital representation, the lattice surgery protocol further comprises:
      applying an ancilla Kirigami code block to the modified Kirigami 3D code comprising the non-Clifford logical gate digital representation; and
      mapping the modified Kirigami 3D code comprising the non-Clifford logical gate digital representation to the ancilla Kirigami code block.

20. The computer program product according to claim 16, wherein the non-Clifford logical gate is a control-control-Z (CCZ) logical gate.

* * * * *